(12) United States Patent
Riehle et al.

(10) Patent No.: US 7,699,335 B2
(45) Date of Patent: Apr. 20, 2010

(54) TRAILER COUPLING

(75) Inventors: Joerg Riehle, Asperg (DE); Wolfgang Gentner, Steinheim (DE); Juergen Still, Ludwigsburg (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 310 days.

(21) Appl. No.: 11/881,151

(22) Filed: Jul. 24, 2007

(65) Prior Publication Data
US 2008/0073874 A1 Mar. 27, 2008

(30) Foreign Application Priority Data
Jul. 29, 2006 (DE) .................. 10 2006 035 261

(51) Int. Cl.
*B60D 1/14* (2006.01)
(52) U.S. Cl. ............... 280/491.1; 280/491.3; 280/478.1
(58) Field of Classification Search ............. 280/491.1, 280/491.3, 478.1
See application file for complete search history.

(56) References Cited

U.S. PATENT DOCUMENTS

| | | | | |
|---|---|---|---|---|
| 4,923,205 | A * | 5/1990 | Durm | 280/491.3 |
| 5,853,186 | A * | 12/1998 | Gentner et al. | 280/491.3 |
| 5,964,475 | A * | 10/1999 | Gentner et al. | 280/420 |
| 6,409,201 | B1 * | 6/2002 | Riehle | 280/491.1 |
| 6,786,500 | B2 * | 9/2004 | Kleb et al. | 280/491.1 |
| 6,860,503 | B2 * | 3/2005 | Aufderheide et al. | 280/491.3 |
| 7,216,886 | B2 * | 5/2007 | Rimmelspacher et al. | 280/491.3 |
| 7,604,249 | B2 * | 10/2009 | Gentner et al. | 280/491.3 |
| 2004/0113391 | A1 * | 6/2004 | Aufderheide et al. | 280/491.1 |
| 2005/0167945 | A1 * | 8/2005 | Rimmelspacher et al. | 280/477 |
| 2005/0167946 | A1 * | 8/2005 | Rampp | 280/491.1 |
| 2007/0007749 | A1 * | 1/2007 | Gentner et al. | 280/491.1 |

FOREIGN PATENT DOCUMENTS

| | | |
|---|---|---|
| DE | 195 21 896 | 1/1997 |
| DE | 196 13 428 | 10/1997 |
| DE | 102 52 722 | 2/2004 |
| DE | 103 36 445 | 3/2005 |
| EP | 1 504 928 | 2/2005 |
| EP | 1 533 149 | 5/2005 |
| EP | 1 741 572 | 1/2007 |

* cited by examiner

*Primary Examiner*—Lesley Morris
*Assistant Examiner*—Michael R Stabley
(74) *Attorney, Agent, or Firm*—Lipsitz & McAllister, LLC

(57) ABSTRACT

In order for a trailer coupling comprising a ball neck which can be moved between an operating position and a rest position and has a coupling ball, also comprising a vehicle-mounted pivot-bearing unit, in which the pivot-bearing body is accommodated such that it can be pivoted about a pivot axis, and further comprising a rotation-blocking device which can be driven by a drive, to be improved such that it can absorb, in constructional terms, the highest possible load moments, it is proposed that the rotation-blocking device has at least one rotation-blocking body, that the rotation-blocking body can be engaged with, and disengaged from, a holder by movement in a guide direction, that there is provided an actuating body which has a pressure-exerting surface and the movement of which allows the at least one rotation-blocking body to be moved and acted on, and that the drive is an actuating drive by means of which the actuating body can be moved between at least one rotation-blocking position and a freewheeling position.

61 Claims, 31 Drawing Sheets

TRAILER COUPLING

This patent application claims the benefit of German Application No. 10 2006 035 261.0, filed Jul. 29, 2006, the teachings and disclosure of which are hereby incorporated in their entirety by reference thereto.

The invention relates to a trailer coupling comprising a ball neck which can be moved between an operating position and a rest position and has a pivot-bearing body disposed at a first end and a coupling ball disposed at a second end, also comprising a vehicle-mounted pivot-bearing unit, in which the pivot-bearing body is accommodated such that it can be pivoted between the operating position and the rest position by a pivoting movement about a pivot axis, and further comprising a rotation-blocking device which can be driven by a drive.

Such trailer couplings are known from the prior art.

In the case of these trailer couplings, however, the drive for the rotation-blocking device and the rotation-blocking device itself are of complex construction.

It is thus an object of the invention to improve a trailer coupling of the generic type such that it can absorb, in constructional terms, the highest possible load moments acting on the ball neck.

This object is achieved, according to the invention, in the case of the trailer coupling of the type described in the introduction, in that the rotation-blocking device has at least one rotation-blocking body which can be moved in a guide direction with at least one component in the radial direction in relation to the pivot axis, in that the rotation-blocking body can be engaged with, and disengaged from, a holder by movement in the guide direction, in that there is provided an actuating body which has a pressure-exerting surface running transversely to the guide direction, can be moved in an actuating direction and the movement of which in the actuating direction allows the at least one rotation-blocking body to be moved, and acted on, in the guide direction, and in that the drive is an actuating drive by means of which the actuating body can be moved in the actuating direction between at least one rotation-blocking position and a freewheeling position.

The advantage of the solution according to the invention can be seen in the fact that, on the one hand, the rotation-blocking device is a straightforward construction and withstands high load moments and, on the other hand, the actuating body of the rotation-blocking device can easily be moved between its rotation-blocking position and its freewheeling position by the drive in the form of an actuating drive.

Particularly straightforward movement of the actuating body is achieved when the drive acts on the actuating body via a self-inhibiting gear mechanism. By means of such a self-inhibiting gear mechanism, it is easily possible to move the actuating body into the respective position, that is to say the at least one rotation-blocking position or the freewheeling position, and to keep it in this position without the drive experiencing any reaction when the ball neck is subjected to loading.

A particularly advantageous solution here provides that the self-inhibiting gear mechanism comprises a spindle gear mechanism with a threaded spindle.

The spindle gear mechanism with the threaded spindle could basically be provided at any desired location and act on the actuating body via further transmission elements.

A particularly straightforward solution in constructional terms provides that the actuating body can be moved by a spindle nut interacting with the threaded spindle.

Particularly straightforward in constructional terms here is a solution in which the actuating body is disposed such that it encloses the threaded spindle, so that the threaded spindle passes through a through-passage of the actuating body.

In particular it is possible, in the case of this solution, for the through-passage to be provided with a mating thread which engages in the threaded spindle, or a spindle nut is disposed in the through-passage.

It is conceivable in principle, within the context of the solution according to the invention, for the actuating direction in which the actuating body can be moved to be selected freely. For example, the actuating direction could be a direction of rotation.

A solution which can be realized particularly straightforwardly in constructional terms, however, is one in which the actuating body can be moved in an actuating direction substantially parallel to the pivot axis.

In respect of the formation of the actuating body, no specific details have been given in conjunction with the prior explanation of the solution according to the invention. Consequently, an advantageous solution provides that, following one after the other in its actuating direction, the actuating body has a retraction holder and a pressure-exerting surface for the at least one rotation-blocking body.

Such a retraction holder and a pressure-exerting surface make it possible, as a result of the actuating body being displaced in the actuating direction, to move the rotation-blocking bodies either into their freewheeling position, namely when they penetrate into the retraction holder, or into their rotation-blocking position, namely when they are subjected to the action of the pressure-exerting surface.

The pressure-exerting surface here could be of any desired formation. The only critical factor for the pressure-exerting surface is for it to vary in the radial direction in relation to the pivot axis.

An advantageous embodiment of a pressure-exerting surface provides that the pressure-exerting surface for the at least one rotation-blocking body is a wedge surface.

Such a wedge surface here may be planar.

In the case of a plurality of rotation-blocking bodies, however, it is particularly advantageous if the pressure-exerting surface is a cone surface which, by straightforward linear movement, can cause the rotation-blocking bodies to move radially in their guide direction.

It is possible in principle, within the context of the solution according to the invention, to operate with a pressure-exerting surface and a retraction holder where the actuating body can be moved back and forth in its actuating direction between its rotation-blocking position and its freewheeling position.

A particularly advantageous solution, however, provides that the actuating body can be moved into two rotation-blocking positions. This has the advantage that it is thus possible by way of relatively straightforward movement kinematics, upon movement of the actuating body, to lock the pivot-bearing body in two rotary positions.

It would be conceivable, for example, to provide dedicated rotation-blocking bodies for each of the rotation-blocking positions.

A particularly advantageous solution, however, is one in which the actuating body can be moved, by a movement in a single movement direction, from a first rotation-blocking position into a freewheeling position and then into a second rotation-blocking position.

This solution considerably simplifies the movement kinematics for the actuating body since, by means of a movement running in a single direction, it is possible to reach two rotation-blocking positions and, between these, a freewheeling position and, by reversing the movement, it is possible, in turn, to pass through the same sequence of rotation-blocking position, freewheeling position and subsequent rotation-blocking position.

A solution which is particularly straightforward and advantageous in constructional terms provides that the actuating body has two pressure-exerting surfaces for each rotation-blocking body, it being possible for the rotation-blocking position of the rotation-blocking body to be reached in each case by way of these pressure-exerting surfaces.

It is particularly advantageous here if, as the actuating body moves in a specific direction, the pressure-exerting surfaces act differently. This is to be understood in that, as the actuating body moves in one movement direction, one pressure-exerting surface runs such that its action on a rotation-blocking body decreases, while the other pressure-exerting surface runs such that its action on the rotation-blocking body increases.

In the simplest case, this can be realized by the pressure-exerting surfaces having different gradients.

It is further advantageous, when two pressure-exerting surfaces are provided, if a first of the pressure-exerting surfaces is associated with the operating position and a second of the pressure-exerting surfaces is associated with the rest position, so that the first of the pressure-exerting surfaces is operative for locking in the operating position, while the second of the pressure-exerting services is operative for locking in the rest position.

In order to be able to realize the freewheeling position straightforwardly, it is expedient if a retraction holder for the respective rotation-blocking body is disposed between the two pressure-exerting surfaces, so that, by virtue of the actuating body being displaced, for example a rotation-blocking body can be moved from its rotation-blocking position realized by the first pressure-exerting surface, by interaction with the retraction holder, into the freewheeling position and, following the retraction holder, can be moved back into a rotation-blocking position, by interaction with the other of the pressure-exerting surfaces.

It is thus also the case that the actuating body is in a first rotation-blocking position when the first of the pressure-exerting surfaces is operative, is in the freewheeling position when the retraction holder is operative, and is in a second rotation-blocking position when the second of the pressure-exerting surfaces is operative.

In particular when the actuating body moves in a direction substantially parallel to the pivot axis, a linear movement in a single direction thus allows transition from locking of the pivot-bearing body, corresponding to the first rotation-blocking position, into a freely rotatable position of the pivot-bearing body, corresponding to the freewheeling position, and then locking of the pivot-bearing body again, corresponding to the second rotation-blocking position.

Such an actuating body can be moved particularly straightforwardly by a drive, in particular an actuating drive, in order to lock the pivot-bearing body in two rotary positions, namely the operating position and the rest position, and to realize free rotatability of the pivot-bearing body between these two rotary positions since, for the transition from the locking position into the freely rotatable position of the pivot-bearing body and further transition from the freely rotatable position of the pivot-bearing body into a locked position again, merely requires movement in one direction of rotation, and there is thus no need for any reversal in direction of rotation of the drive, which would make it imperative to sense, and correspondingly evaluate, the individual movement states of the pivot-bearing body and of the actuating body.

The solutions, up until now, have given an explanation merely of the drive of the rotation-blocking device, this drive making it possible to transfer the rotation-blocking device from at least one rotation-blocking position into a freewheeling position and vice versa.

A solution according to the invention is particularly advantageous if it also provides a motor drive for executing the pivoting movement of the pivot-bearing body.

For example, it is conceivable to provide two motor drives, one motor drive driving the rotation-blocking device and one motor drive being provided for executing the pivoting movement of the pivot-bearing body.

In particular since the rotation-blocking device is always driven at times at which the intention is for no pivoting movement of the pivot-bearing body to take place and, on the other hand, pivoting movement of the pivot-bearing body always takes place when there is no need for the rotation-blocking device to be driven, it is conceivable to provide a switchover device which alternately switches over the drive power supplied, for example from a power source, from one drive to the other drive, so that the drive power made available from a separate, for example motor-vehicle-mounted supply device can be used either for actuating the rotation-blocking device or for pivoting the pivot-bearing body. In this case, however, an appropriate sensor arrangement has to sense when the rotation-blocking device is in the rotation-blocking position or the freewheeling position and when the pivot-bearing body is in the position corresponding to the operating position or the position corresponding to the rest position and, in accordance with the positions detected by the sensor arrangement, the drive power has to be switched over from one drive to the other.

In the case of a drive of the rotation-blocking device being independent of the drive for the pivoting movement of the pivot-bearing body, there is the problem that, in the case of malfunctioning, it is difficult to locate clear starting positions both for the pivoting movement of the pivot-bearing body and for the rotation-blocking device.

As an alternative, or in addition, to the previously described solutions, an advantageous solution thus provides that the drive for the rotation-blocking device and the drive for the pivoting movement of the pivot-bearing body are coupled by a planet gear mechanism.

Such a planet gear mechanism allows the two movements to be coupled to one another.

In the case of such a planet gear mechanism, it would still be possible, as before, to provide two separate motor drives, the drive powers of which can be added together, if appropriate, as a result of the planet gear mechanism.

If for example, in the case of the planet gear mechanism, the sun wheel were to be driven by one drive and a planet carrier for the planet wheels were to be driven by another motor drive, then it would be possible, with the internal ring gear at a standstill, to add together the drive powers for the rotary movement of the sun wheel and the drive for the rotation-blocking device, this drive being coupled, for example, to the sun wheel, while, when the motor drive for the sun wheel is at a standstill, the still operative motor drive for the planet carrier could then be used for driving the internal ring gear, for example for executing the pivoting movement of the pivot-bearing body.

The motor drive for the sun wheel, on the one hand, would provide additional drive power in the case of the internal ring gear being at a standstill and, on the other hand, would allow straightforward switchover to the drive of the internal ring gear when the drive of the sun wheel is at a standstill.

A particularly suitable planet gear mechanism of this type, however, is one in which the planet gear mechanism can be driven by a single motor drive.

It is preferable here for the planet gear mechanism to be integrated between the drive for the rotation-blocking device and the drive for the pivoting movement of the pivot-bearing body such that the planet gear mechanism allows changeover between a drive of the rotation-blocking device and the pivoting movement of the pivot-bearing body.

It is provided here, for example, that a planet-wheel carrier of the planet gear mechanism can be driven by the motor drive.

Furthermore, it is expediently provided that a sun wheel of the planet gear mechanism is coupled to the drive for the rotation-blocking device.

Furthermore, it is expediently provided that an internal ring gear of the planet gear mechanism is coupled to the drive for the pivoting movement.

It is advantageously provided here that the internal ring gear is coupled in a rotationally fixed manner to the pivot-bearing part.

In the simplest case, the internal ring gear is disposed directly on the pivot-bearing part.

There are also other possible ways, however, of arranging the individual gear elements of the planet gear mechanism.

For example, it would likewise be conceivable to couple the planet-wheel carrier to the actuating drive for the rotation-blocking device or to couple the planet-wheel carrier to the pivot-bearing part.

In order, in the case of a planet gear mechanism which is driven by a single motor drive, either to drive the rotation-blocking device or to drive the pivoting movement, it is advantageously provided that driving of the pivoting movement or of the rotation-blocking device takes place depending on whether the drive of the rotation-blocking device or of the pivoting movement is inhibited.

Such inhibiting of the pivoting movement or of the rotation-blocking device can be realized in different ways.

The pivoting movement can easily be inhibited in that the pivot-bearing part can be locked relative to the guide body, so that the pivoting movement is inevitably inhibited when the pivot-bearing part is locked.

The drive of the rotation-blocking device can be inhibited in a wide variety of different ways.

For example, it would be conceivable—as has already been mentioned—to assign the rotation-blocking device an additional motor drive which is self-inhibiting, and to inhibit the rotation-blocking device by switching off this motor drive.

It would be possible here, for example, for the additional motor drive for the rotation-blocking device to be switched on for as long as the pivoting movement is inhibited and the rotation-blocking device is to be driven, but, at the moment at which the pivoting movement is released and the drive of the rotation-blocking device is to be inhibited, to switch off the additional drive for the rotation-blocking device and, in this way, to inhibit the drive of the rotation-blocking device via the planet gear mechanism.

Driving of the pivoting movement thus inevitably takes place as driving of the planet gear mechanism continues.

A particularly advantageous solution here provides that at least one inhibiting arrangement is provided in order to inhibit the drive of the rotation-blocking device.

Such an inhibiting arrangement could be—as is conventional with planet gear mechanisms—for example a braking device, so that the rotation-blocking device is driven with braking action.

It would be possible here for the inhibiting arrangement to act, for example, directly on the planet gear mechanism.

It would also be conceivable, however, to allow the inhibiting arrangement to act on the actuating drive. An advantageous solution provides that the at least one inhibiting arrangement acts on the actuating body of the rotation-blocking device.

The inhibiting arrangement may be controllable in a wide variety of different ways. An advantageous solution provides that the at least one inhibiting arrangement can be controlled in dependence on a rotary position of the pivot-bearing body.

It is basically necessary, for a rotation-blocking position and a freewheeling position, to have just one inhibiting arrangement, which inhibits the transition from the freewheeling position into the rotation-blocking position until the respective operating position or the respective rest position has been reached.

If, however, the operating position is assigned the first rotation-blocking position and the rest position is assigned the second rotation-blocking position, then it is advantageous, in respect of a straightforward solution in constructional terms, if two inhibiting arrangements are provided, a respective inhibiting arrangement inhibiting transition from the freewheeling position into one of the rotation-blocking positions in each case until the respective rotary position, that is to say the operating position or the rest position, of the pivot-bearing body has been reached.

The inhibiting arrangements here may be formed in a wide variety of different ways.

Thus, an advantageous solution provides that the inhibiting arrangement has at least one inhibiting body, which is operative between the actuating body and the pivot-bearing body.

Such a constructional solution is particularly advantageous in that the inhibiting body is operative directly between the pivot-bearing body and the actuating body and can thus easily sense the two movements and, if appropriate, inhibit the movement of the actuating body.

In order to sense the positions of the pivot-bearing body and actuating body, it is preferably provided that the actuating body and the pivot-bearing body each have a guide track, which interacts with the inhibiting body. For example, it is provided in this case that an inhibiting body is provided for transition from the freewheeling position into one of the rotation-blocking positions.

The inhibiting body here preferably acts such that it blocks, in the freewheeling position, the movement of the actuating body from the freewheeling position into the one rotation-blocking position until the pivot-bearing body is located in the operating or rest position which can be blocked by the rotation-blocking position.

Furthermore, an inhibiting body is preferably provided for transition from the freewheeling position into the other rotation-blocking position.

In this case, the inhibiting body is formed, and interacts with the guide tracks, such that it blocks, in the freewheeling position, the movement of the actuating body from the freewheeling position into the other rotation-blocking position until the pivot-bearing body is located in the rest or operating position which can be blocked by the other rotation-blocking position.

As an alternative, or in addition, a preferred solution provides that an elastic energy store forces the inhibiting body in the direction of its position in which it exerts an inhibiting action.

In respect of the arrangement of the planet gear mechanism, no specific details have been given up until now.

In principle, the planet gear mechanism could be disposed such that it is located on a side of the actuating body which faces a carrying element of the pivot-bearing unit.

A solution which can be realized in a particularly compact manner in constructional terms, however, is one in which the planet gear mechanism is disposed on a side of the actuating body which is opposite to the carrying element of the pivot-bearing unit.

As an alternative, or in addition, to the previously described solutions, a further solution to the object according to the invention provides that the actuating body is secured in the operating position by a securing arrangement. Such a securing arrangement makes it possible to secure the actuating body in addition to the advancement means or actuating drive provided and thus to improve the safety of the trailer coupling according to the invention, in particular in the operating position.

It is particularly advantageous if the securing arrangement can be actuated by a drive element, so that the securing arrangement can be released when the actuating body is driven.

For this purpose, the drive element is preferably formed such that it drives an actuating track of the securing arrangement.

The securing arrangement may be formed in different ways. A preferred solution provides that this securing arrangement has a securing body which interacts with a securing guide means which is coupled for movement to the actuating body.

The securing body and the securing guide means here are preferably formed such that at least one position of the actuating body, in particular the rotation-blocking position in the operating position of the ball neck, can be secured in a positive manner.

In the simplest case here, the securing guide means is formed such that it has at least one holder, with which the securing body can be brought into engagement.

As an alternative, or in addition, the object mentioned in the introduction is further achieved by a trailer coupling in which, according to the invention, in the rotation-blocking position corresponding to the operating position, the actuating body can be subjected to the action of an elastic energy store acting in the direction of the rotation-blocking position.

Such an elastic energy store makes it possible to achieve play-free fixing of the pivot-bearing body in that the actuating body, in the rotation-blocking position corresponding to the operating position, is constantly subjected to force, and thus constantly forces the rotation-blocking body into the corresponding holder, and thus substantially eliminates the play between the rotation-blocking body and holder and the guide body and rotation-blocking body.

Furthermore, subjecting the actuating body to the action of an elastic energy store in this way has the advantage that it is thus also possible to eliminate play caused by wear, for example caused by the corresponding holders widening.

For this purpose, the elastic energy store can preferably be subjected to stressing by the actuating drive in order to generate an elastic force action, that is to say, rather than the energy store being subjected to stressing by additional means, the elastic energy store is subjected to stressing in that the actuating drive moves the actuating body into the rotation-blocking position corresponding to the operating position and thus inevitably contributes to the elastic energy store being subjected to stressing.

It would be possible here for the elastic energy store to be disposed outside the drive train, that is to say such that for example either the elastic energy store constantly subjects to the actuating body to force or such that for example the entire drive train is subjected to the action of the elastic energy store and can be displaced such that the rotation-blocking position corresponding to the operating position is constantly maintained.

A particularly advantageous solution provides that the elastic energy store is disposed in a drive train for the actuating body.

The drive train of the actuating body here leads, for example, from one drive, for example a drive motor, to the linear drive for the actuating body. For example, it would be conceivable in this case to provide, in the drive train, a torsion shaft which, upon reaching that rotation-blocking position of the actuating body which corresponds to the operating position, builds up an elastic force effect and torsion of the same.

As an alternative, or in addition, an advantageous exemplary embodiment provides that the elastic energy store is operative between a spindle nut and the actuating body.

In this case, the elastic energy store may be realized, for example, by individual springs or by a group of cup springs.

As an alternative, or in addition, to the previously described exemplary embodiments, a further solution to the object mentioned in the introduction provides, according to the invention, that the holders for the at least one rotation-blocking body have essentially planar abutment regions, against which it is possible to apply the rotation-blocking bodies in the rotation-blocking position.

The abutment regions here are preferably formed such that they extend, in the guide direction, over an adjusting region of the rotation-blocking bodies. The abutment regions, which are located on opposite sides of the rotation-blocking bodies, are preferably oriented relative to one another such that they enclose an acute angle with one another.

In respect of the individual features of the rotation-blocking device, no specific details have been given up until now.

Thus, an advantageous solution provides that the rotation-blocking device comprises not just one rotation-blocking body, but at least two rotation-blocking bodies, and that the rotation-blocking bodies can be moved in the respective guide direction by a common actuating body.

The advantage of this solution can be seen in the fact that it is thus easily possible to achieve rotational blocking which withstands high loading of the ball neck.

It is particularly advantageous here if the rotation-blocking device comprises at least three rotation-blocking bodies, since the loading capability of the ball neck is thus even better.

An expedient solution provides that the rotation-blocking bodies are disposed relative to the actuating body such that at least their reaction forces acting on the actuating body, and directed transversely to the pivot axis, compensate for one another at least in part. Such a solution thus has the advantage that the actuating body need not be designed such that it has to be mounted in a stable manner in order to absorb the reaction forces to which it is subjected by the rotation-blocking bodies; rather, it can be mounted very straightforwardly if the reaction forces to which the actuating body is subjected by the rotation-blocking bodies cancel out one another at least in part.

It is even more advantageous if the rotation-blocking bodies are disposed relative to the actuating body such that at least their reaction forces acting on the actuating body, and directed transversely to the pivot axis, substantially cancel out one another.

The rotation-blocking bodies can basically be disposed in any desired manner relative to the actuating body. One exemplary embodiment provides that the rotation-blocking bodies are disposed around the actuating body. By means of such a solution, on the one hand, the rotation-blocking bodies may be disposed in a space-saving manner and, on the other hand, it is easily possible to compensate, at least in part, for the reaction forces acting on the actuating body.

It is advantageous here if the rotation-blocking bodies are disposed substantially symmetrically in relation to a plane running perpendicularly to the pivot axis.

In order to achieve, as far as possible, play-free rotational fixing of the pivot-bearing body, it is preferably provided that at least two of the rotation-blocking bodies interact with their associated holders such that these subject the pivot-bearing body to opposing torques.

These two opposing torques make it possible for the pivot-bearing body to be fixed in a play-free manner by the pivot-bearing unit.

In respect of the guidance of the rotation-blocking bodies, no specific details have been given up until now, in particular in respect of how the rotation-blocking bodies, for their part, are to be guided in the guide direction.

For example, it would be conceivable to guide the at least one rotation-blocking body by way of a guide holder in the pivot-bearing body and to provide stationary holders with which the respective rotation-blocking body can be engaged, or from which it can be disengaged.

It is particularly advantageous, however, if the rotation-blocking body is guided by a guide body which adjoins the pivot-bearing body in the radial direction.

The guide body is preferably formed here such that it has a guide sleeve with a guide holder for the respective rotation-blocking body.

Such a guide body can also, in particular, advantageously be used since a guide of the actuating body is connected to the guide body, so that mounting for the actuating body can straightforwardly and advantageously be provided in this way.

Furthermore, the guide body is preferably disposed such that it is part of the vehicle-mounted pivot-bearing unit.

In respect of the arrangement of the guide body, of the pivot-bearing body and of the actuating body, no specific details have been given. It would thus be conceivable for the actuating body to enclose the guide body and for the pivot-bearing body to be enclosed by the guide body, that is to say to engage in the guide body.

An advantageous solution, however, provides that the actuating body is enclosed by the guide body, and the pivot-bearing body engages around the guide body.

It is expediently provided for this solution, in particular, that the pivot-bearing body forms an outer body which encloses the pivot-bearing unit on the outside and is disposed such that it cannot be displaced in the direction of the pivot axis in relation to the pivot-bearing unit.

The first end of the ball neck here is preferably fitted on such an outer body.

Further features and advantages of the invention form the subject matter of the following description and of the drawings of a number of exemplary embodiments.

Figure 4:
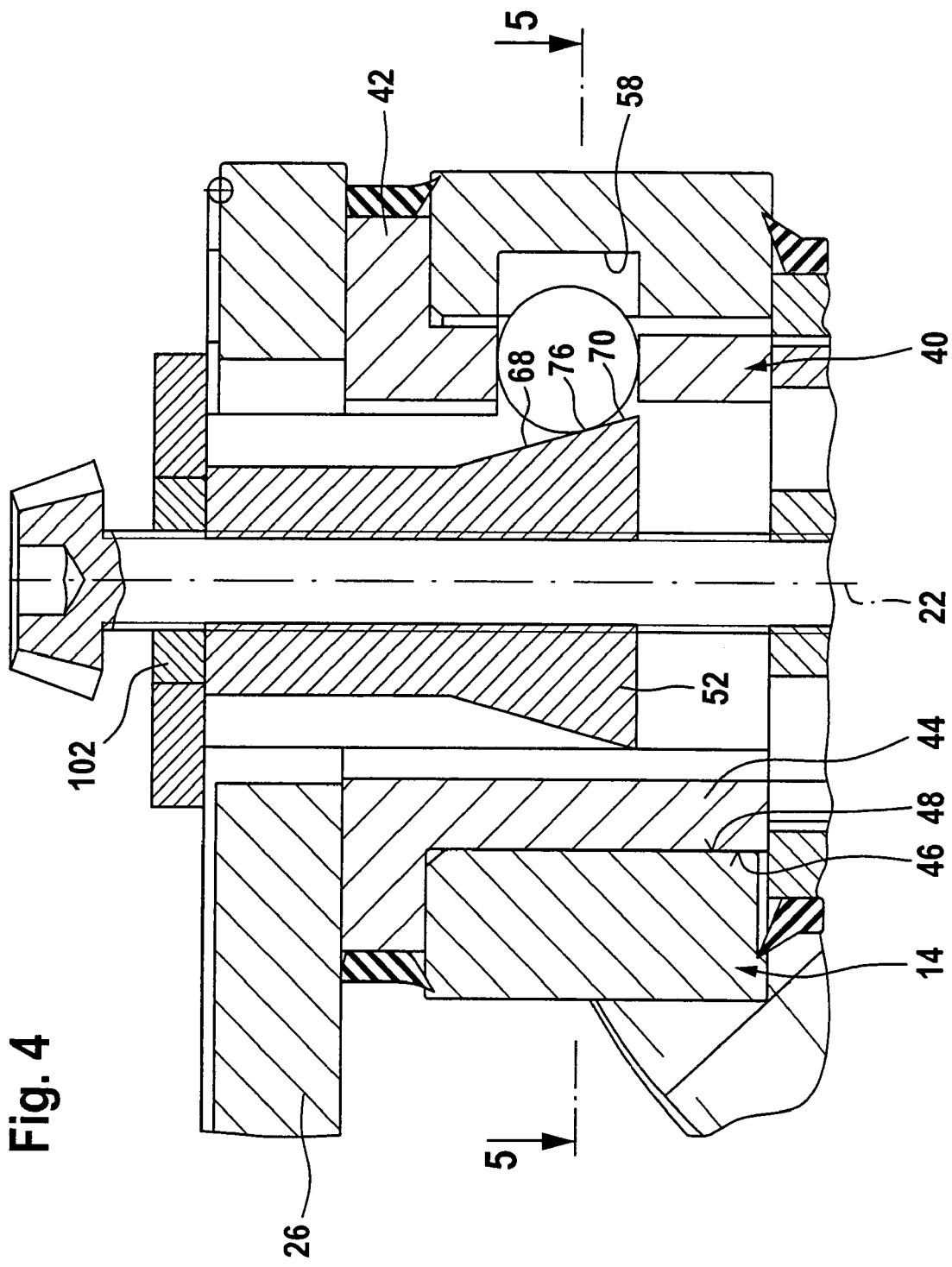
FIG. 4 shows a partial section, taken along a section plane running through the pivot axis and one of the rotation-blocking bodies, in a blocking position of the rotation-blocking elements and an active position of an actuating body.
Figure 5:
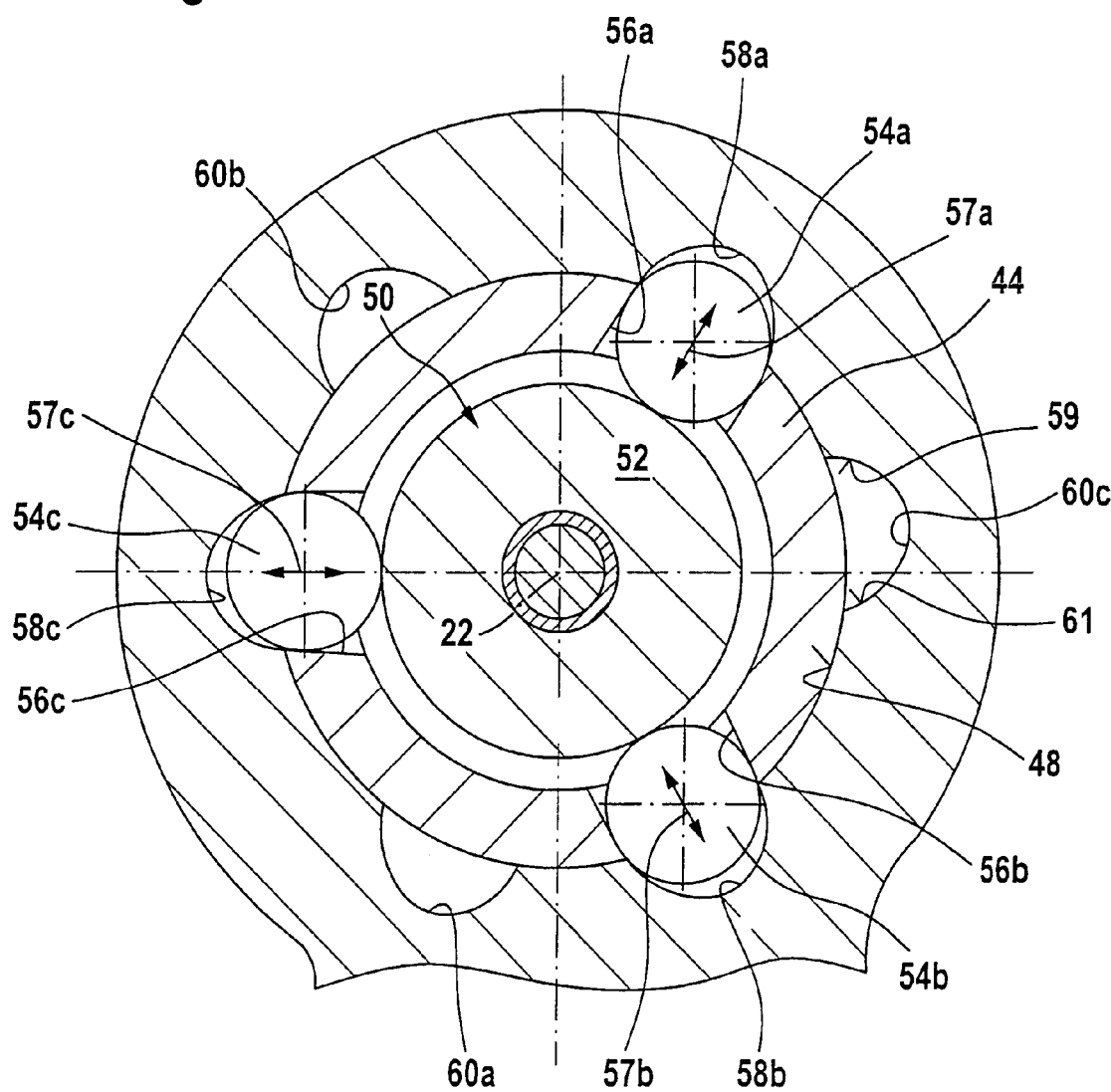
FIG. 5 shows a section along line 5-5 in FIG. 4.
Figure 30:
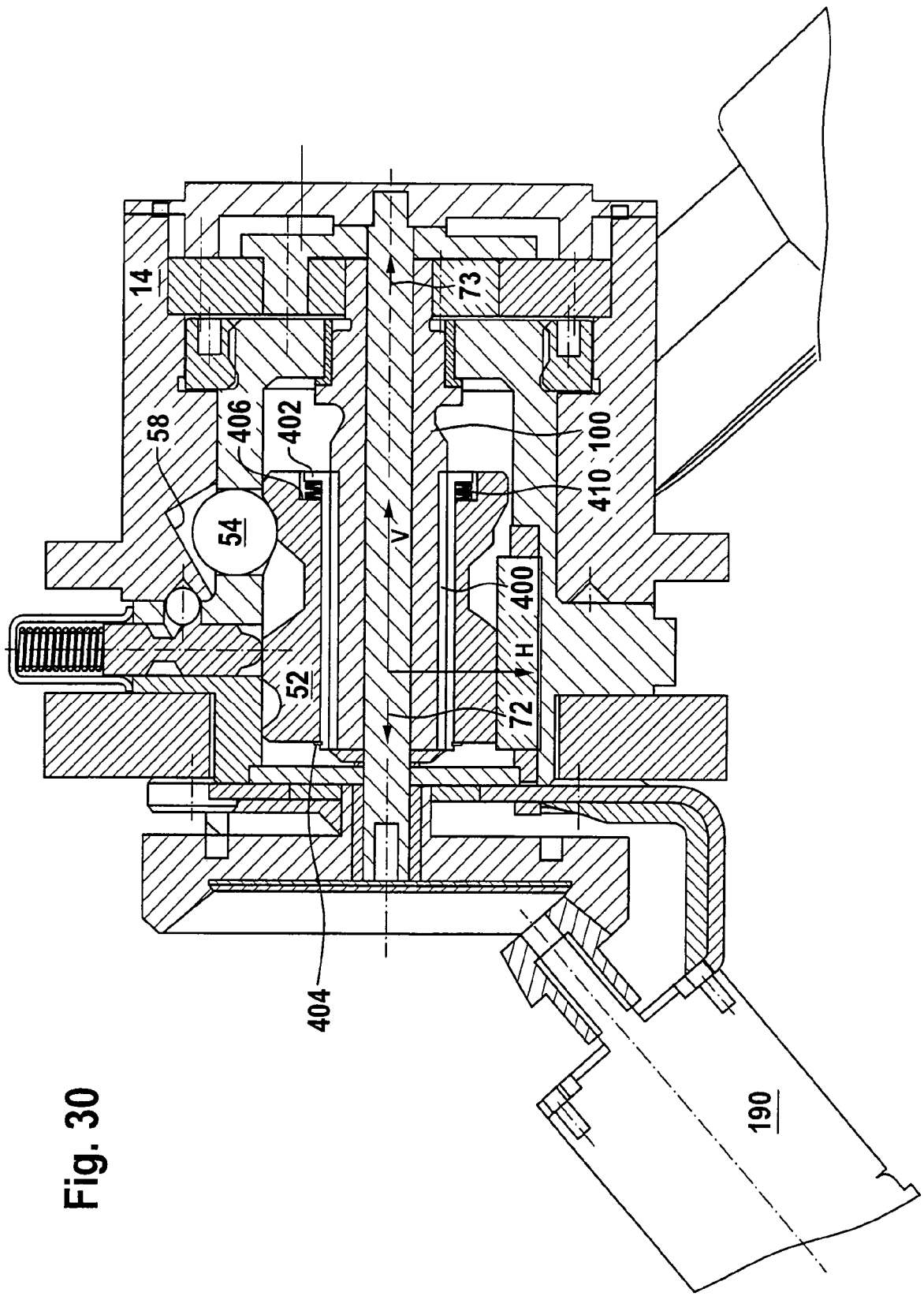
Figure 31:
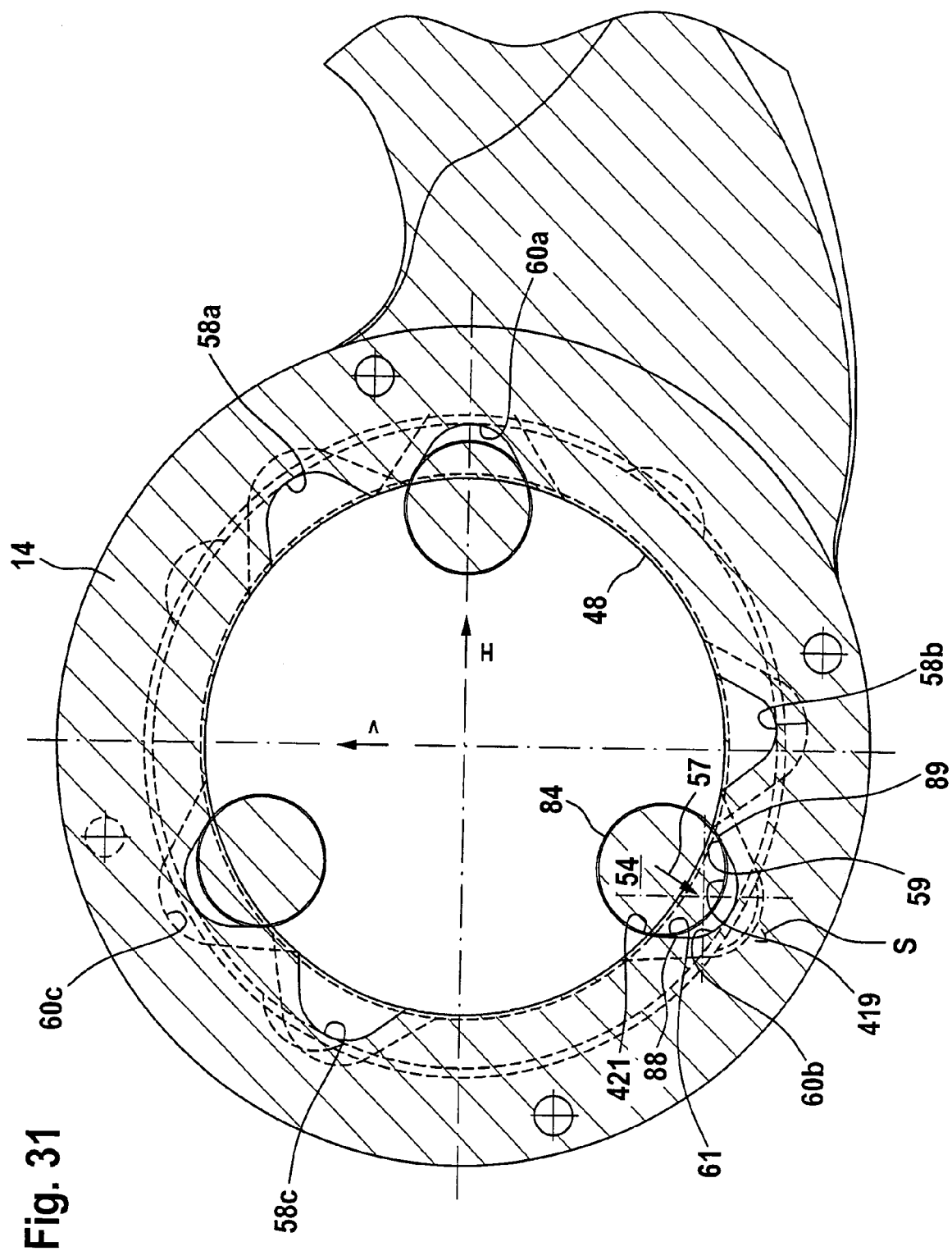

FIG. 30 shows a section, similar to FIG. 4, through a fourth exemplary embodiment of the trailer coupling according to the invention with the rotation-blocking body and actuating body located in a first rotation-blocking position; and FIG. 31 shows a section, similar to FIG. 5, through a fifth exemplary embodiment of a trailer coupling according to the invention, but without the guide body and the actuating body being illustrated.

Figure 1:
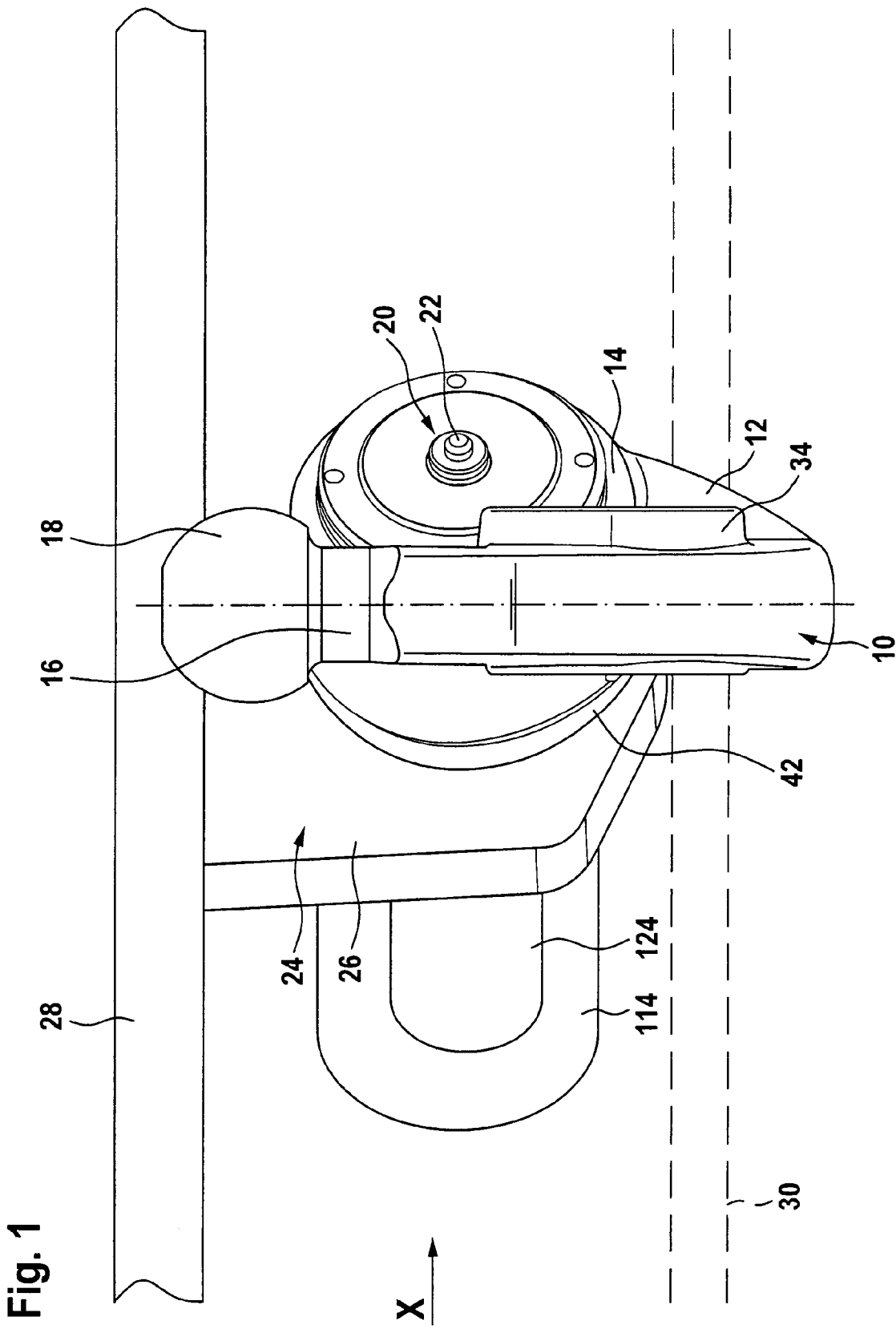
FIG. 1 shows a plan view of a first exemplary embodiment of a trailer coupling according to the invention with a view in the direction of travel of the trailer coupling mounted on a vehicle tail, the trailer coupling being located in its operating position.
Figure 2:
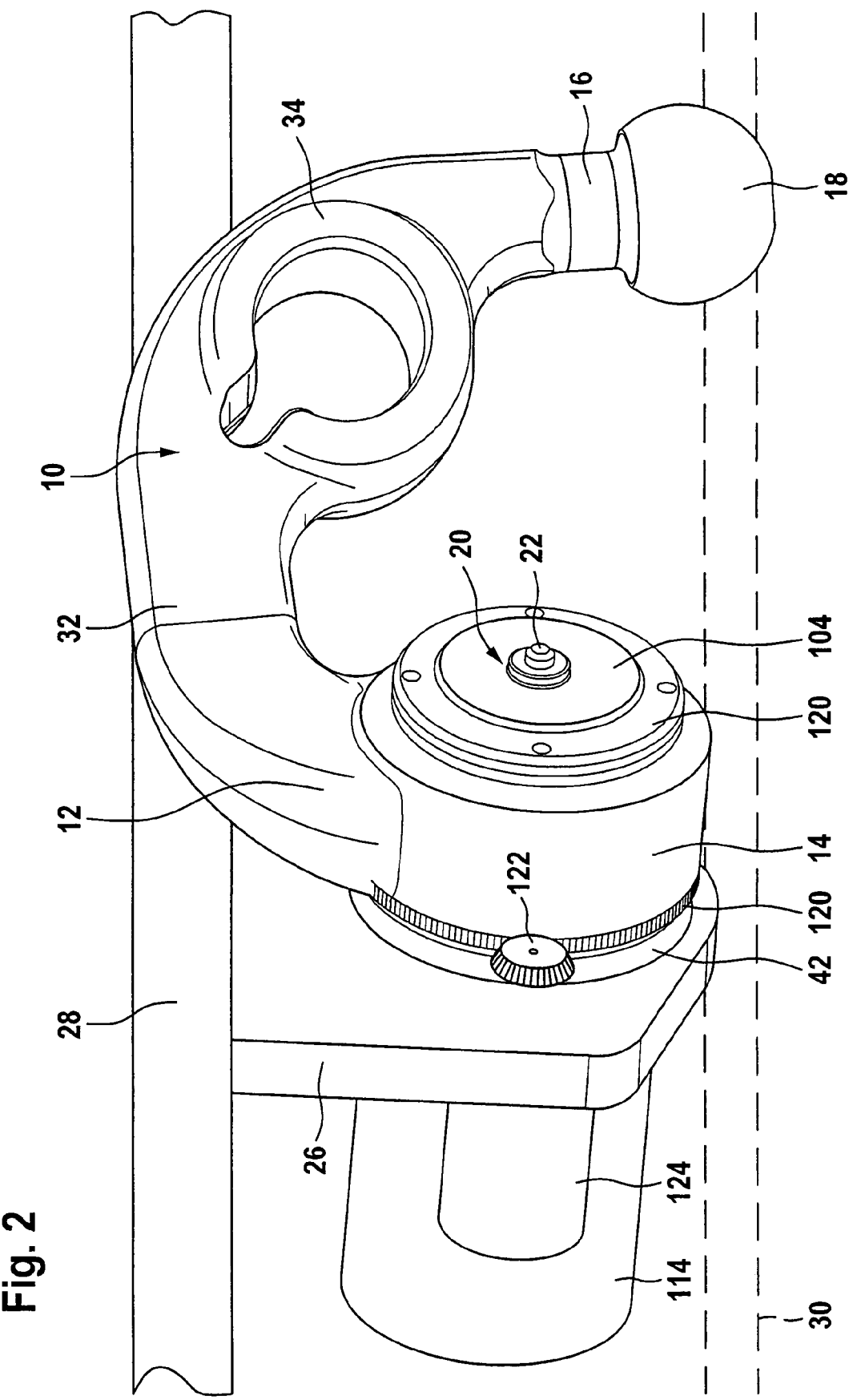
FIG. 2 shows a view corresponding to FIG. 1, this time of the trailer coupling located in the rest position.

A first exemplary embodiment of a trailer coupling according to the invention, illustrated in FIG. 1 in an operating position A and in FIG. 2 in a rest position R, comprises a ball neck which is designated as a whole by 10, is retained, by way of a first end 12, on a pivot-bearing body 14 and, at a second end 16, carries a coupling ball which is designated as a whole by 18 and on which it is possible to fix a coupling-ball holder of a trailer.

Figure 3:
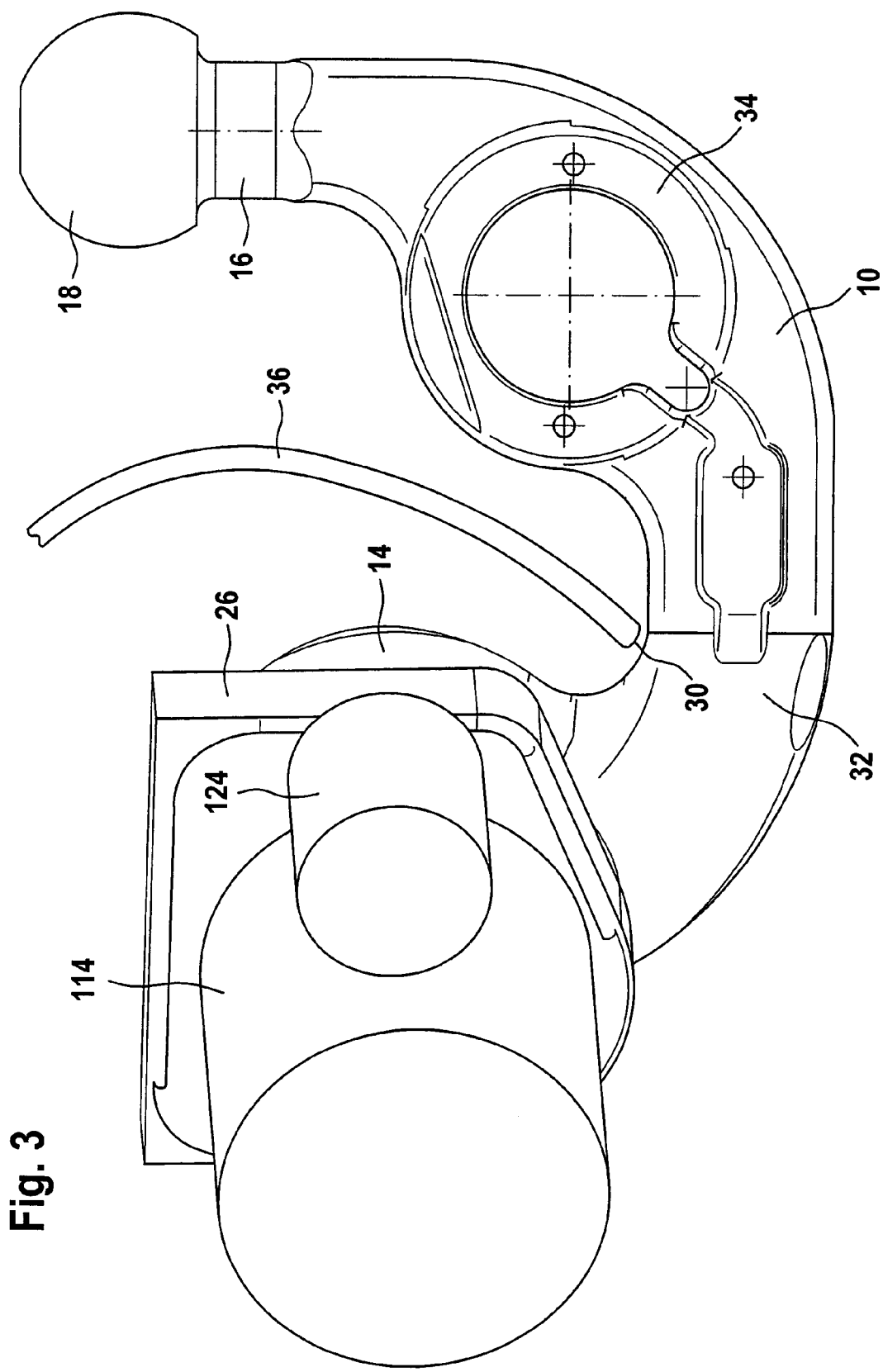
FIG. 3 shows a view in the direction of the arrow X in FIG. 1.

The pivot-bearing body 14 is mounted by a pivot-bearing unit, designated as a whole by 20, such that it can be pivoted about a pivot axis 22 relative to a vehicle-mounted carrier 24, the carrier 24 preferably having a carrying plate 26, which holds the pivot-bearing unit 20 and preferably extends in a plane perpendicular to the pivot axis 22, and a vehicle-mounted transverse carrier 28, which can be secured in a known manner on the tail of a vehicle body, to be precise such that the pivot-bearing unit 20 and the carrier 24 are located on that side of a lower edge 30 of a bumper unit 36 which is directed away from a roadway surface, and are covered by the bumper unit 36 (FIG. 3).

In the operating position, which is illustrated in FIG. 1, the ball neck 10 engages, by way of a portion 32 which follows the first end 12, beneath the lower edge 30 of the bumper unit 36, so that the second end 16 and the coupling ball 18, together with a socket holder 34, are located on a side of the rear bumper unit 36 which is directed away from the vehicle body, while, in the rest position, both the pivot-bearing unit 20 and the entire ball neck 10, together with the coupling ball 18, are covered from view from the rear by the rear bumper unit 36.

The pivot-bearing unit 20 comprises, as is illustrated in FIGS. 4 and 5, a guide body 40, which is fixed to the carrying plate 26 by way of a flange 42, and a guide sleeve 44, which, starting from the flange 42, extends away from the carrying plate 26 and on which the pivot-bearing body 14 is mounted in a rotatable manner. For this purpose, the guide sleeve 44 comprises a cylindrical outer lateral surface 46, on which the pivot-bearing body 14 is seated by way of a cylindrical inner surface 48 and is thus guided for rotation around the pivot axis 22, so that the pivot-bearing body 14 can be rotated relative to the guide body 40 such that the ball neck 10 can be pivoted from the operating position A into the rest position R and vice versa.

By being fixed to the carrier plate 26 and the carrier 24, the guide body 40 thus forms the means by which the pivot-bearing body 14 is mounted on the vehicle for rotation.

In order to fix the pivot-bearing body 14 in the operating position A and the rest position R, the pivot-bearing unit 20 is provided with a rotation-blocking device, which is designated as a whole by 50 and has an actuating body 52, a plurality of rotation-blocking bodies 54, which can be acted on by the actuating body 52 and are guided in guide holders 56 of the guide sleeve 44 such that they can be moved in a guide direction 57 running substantially radially in relation to the pivot axis 22, and also, starting from the inner surface 48 of the pivot-bearing body 14, has first holders 58 and second holders 60, which extend into the pivot-bearing body and with which the rotation-blocking bodies 54 can be brought into engagement in the operating position A and in the rest position R, respectively, the holders 58, 60 having wall surfaces 59, 61 which are spaced apart from one another to an increasingly lesser extent in the radial direction in relation to the pivot axis 22.

If, for example, the rotation-blocking device 50, as is illustrated in conjunction with FIGS. 4 and 5 for the first exemplary embodiment, comprises a set of three rotation-blocking bodies 54a, 54b and 54c, then the guide sleeve 44 has a set of three guide holders 56a, 56b and 56c, in which the rotation-blocking bodies 54a, 54b and 54c are guided such that they can be displaced in the guide direction 57 running substantially radially in relation to the pivot axis 22, and the pivot-bearing body 14 is provided with a set of first holders 58a, 58b and 58c, with which the rotation-blocking bodies 54a, 54b and 54c can be brought into engagement in the operating position A, and with a set of second holders 60a, 60b and 60c, with which the rotation-blocking bodies 54a, 54b and 54c can be brought into engagement in the rest position R.

For suitable movement and positioning of the rotation-blocking bodies 54 in the guide direction 57, the actuating body 52 is provided with retraction holders 62, formed in the simplest case by a cylindrical actuating-body surface 63 which is set back from the guide body 40 in the radial direction in relation to the pivot axis 22, and with pressure-exerting surfaces 66, which follow the retraction holders 62 in the axial direction 64 and, in the simplest case, are formed as a cone surface 67 which, starting from the cylinder surface 63, widens conically in the radial direction in relation to the pivot axis 22. In their freewheeling position or release position, the rotation-blocking bodies 54 rest in the region of the retraction holders 62, that is to say of the cylinder surface 63 of the actuating body 52, and have thus been moved into the guide body 40 to such an extent in the radial direction in relation to the pivot axis 22 that they no longer project beyond the outer lateral surface 46 of the guide sleeve 44.

By means of the pressure-exerting surfaces 66, as the actuating body 52 is displaced to an increasing extent, the rotation-blocking bodies 54 can be moved outward in the axial direction 64, radially in relation to the guide sleeve 44, until they are located in a first rotation-blocking position, in which the rotation-blocking bodies 54 have been pushed outward in their guide direction 57 to such an extent that they engage either in the holders 58 or the holders 60 of the pivot-bearing body 14 and thus secure the latter relative to the guide sleeve 44.

For the sake of simplicity, the pressure-exerting surfaces 66 have been illustrated as cone surfaces 67 for the exemplary embodiments described. Instead of a cone, however, it is possible to provide any body which widens increasingly and continuously in the radial direction in relation to the pivot axis 22 and is capable of moving the rotation-blocking bodies 54 in their guide directions 57 when the actuating body 52 is displaced in the axial direction 64.

Figure 6:
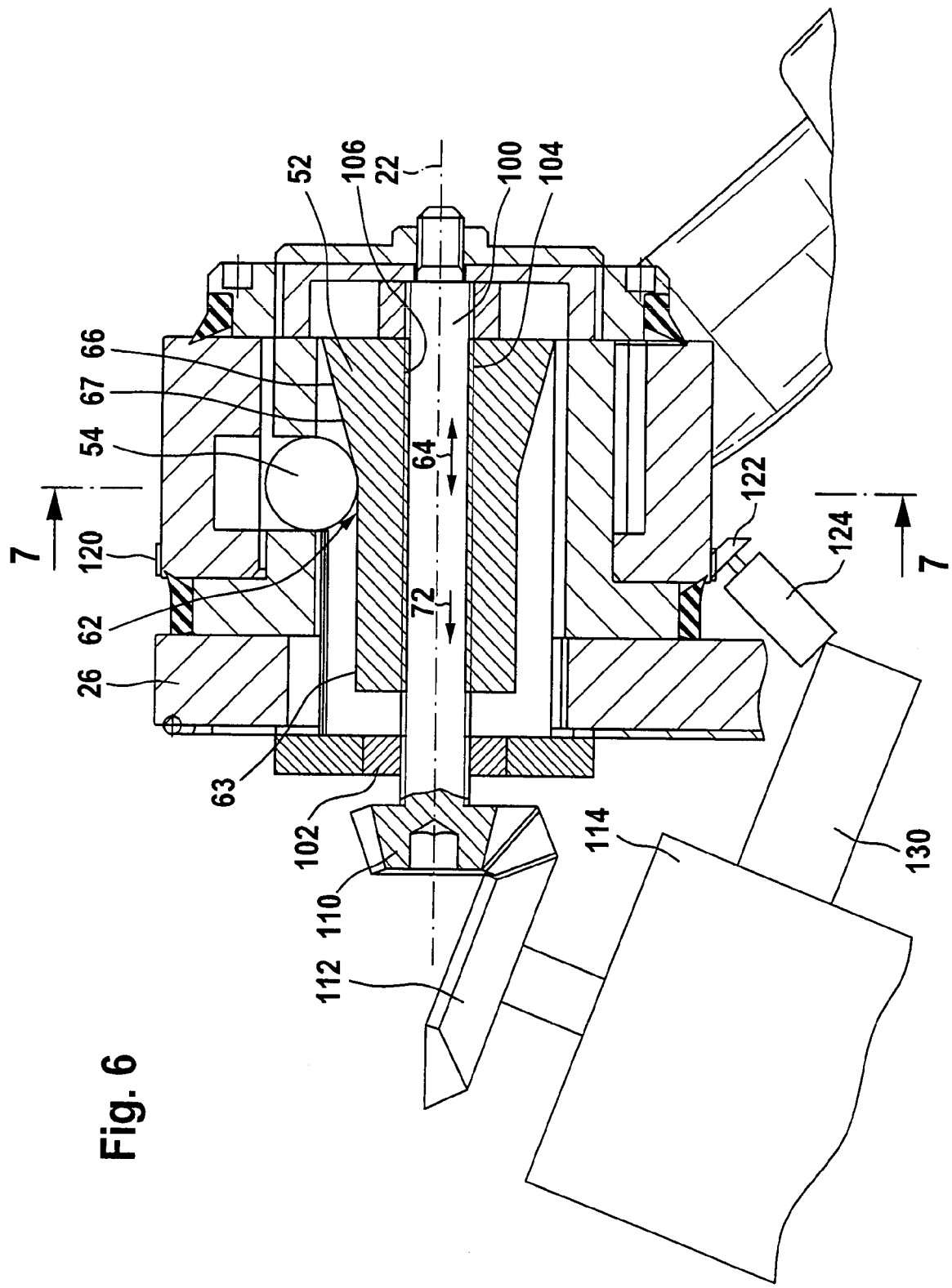
FIG. 6 shows an illustration similar to FIG. 4, with the rotation-blocking body located in the release position and the actuating body located in the inactive position.
Figure 7:
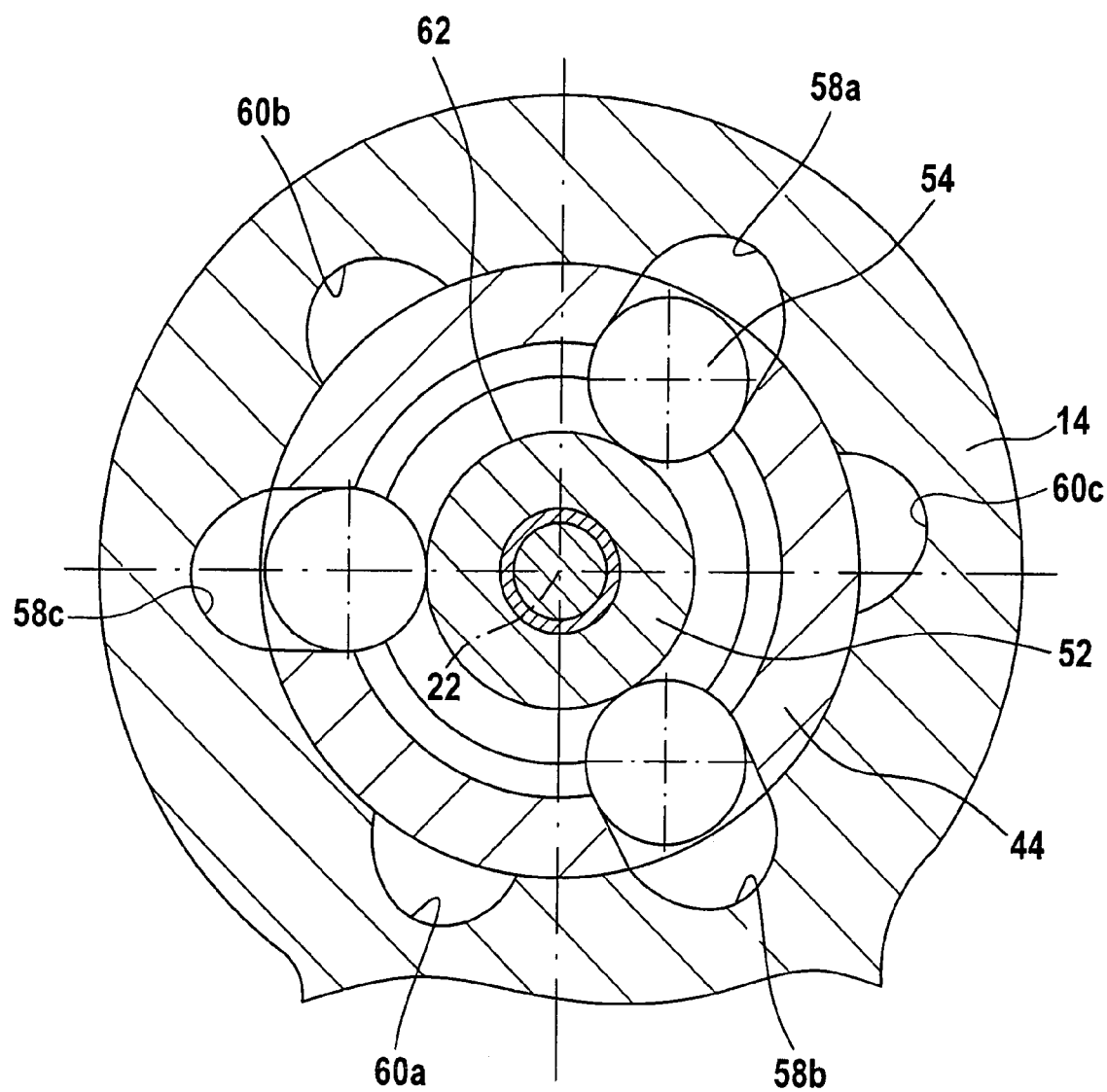
FIG. 7 shows a section corresponding to FIG. 5 with the rotation-blocking bodies and the actuating body positioned as in FIG. 6.

In order either to retain the rotation-blocking bodies 54 in their rotation-blocking position by subjecting them to the action of the pressure-exerting surfaces 66 or to allow them to rest on the retraction holder 62 in the freewheeling position, the actuating body 52 can be displaced in the axial direction 64 parallel to the pivot axis 22, in particular coaxially in relation to the latter, to be precise such that either the retraction holder 62 is facing the respective rotation-blocking body 54 and makes it possible for this rotation-blocking body in its active position, as is illustrated in FIGS. 6 and 7, to penetrate into the guide sleeve 44 in the direction of the retraction holder 62, radially in relation to the pivot axis 22, this making it possible for the respective rotation-blocking bodies 54 to release the first holders 58 or the second holders 60 in respect of rotation, together with the pivot-bearing body 14, about the pivot axis 22, so that it is possible for the pivot-bearing body 14, together with the ball neck 10, to be rotated freely, and without obstruction, relative to the guide sleeve 44, as is illustrated in FIGS. 6 and 7, in which case the rotation-blocking bodies 54 do not extend beyond the outer lateral surface 46 of the guide sleeve 44.

Displacement of the actuating body 52 in the direction 72, toward the carrying plate 26, with the rotation-blocking body 54 seated on the respective retraction holder 62, causes the respective rotation-blocking body 54 to be moved out of the retraction holder 62 and, as a result of the pressure-exerting surface 66, to be moved outward in its guide direction 57, in the radial direction in relation to the pivot axis 22, in which case it reaches its first rotation-blocking position and penetrates either into the respective first holder 58 or into the respective second holder 60 and thus prevents the pivot-bearing body 14 from being able to rotate freely.

The actuating body 52 can be moved axially 64 in the direction 72 such that the rotation-blocking bodies 54 are subjected to the action, in the first instance, of initial regions 68 of the pressure-exerting surfaces 66 and then the rotation-blocking bodies 54 are subjected to the action of those regions of the respective pressure-exerting surfaces 66 which are increasingly spaced apart radially outward from the pivot axis 22, these rotation-blocking bodies thus being forced to an increasing extent, for example in the operating position A of the ball neck 10, into the first holders 58a, 58b and 58c, as is illustrated in FIGS. 4 and 5, in order thus to achieve substantially play-free fixing of the pivot-bearing body 14 relative to the guide body 40, in this case relative to the guide sleeve 44.

In this rotation-blocking position of the rotation-blocking bodies 54, the actuating body 52 is located in its active position such that, as is illustrated in FIGS. 4 and 5, the actuating bodies 52 are supported approximately on intermediate regions 76, which are located between the initial regions 68 of the pressure-exerting surfaces 66 and the end regions 70 of the latter, these end regions being spaced apart from the pivot axis 22 to the greatest radial extent.

Play-free locking of the pivot-bearing body 14 by the rotation-blocking bodies 54 located in their rotation-blocking position can be achieved particularly advantageously when the rotation-blocking bodies 54 and the holders 58 and 60 are configured such that, as one of the rotation-blocking bodies 54 penetrates to an increasing extent into one of the holders 58 or 60, and the rotation-blocking bodies 54 butt against one side of the holders 58 and 60, each of the rotation-blocking bodies 54, with the holder 58 or 60 interacting therewith, causes the pivot-bearing body 14 to rotate, it being the case that the entire set of rotation-blocking bodies 54a to 54c, for fixing the pivot-bearing body 14 in a play-free manner, subjects all of the holders 58 or 60 to two opposing torques 90, 92.

As is illustrated, for example, in FIGS. 8 to 11, the rotation-blocking body 54b butts, by way of its lateral surface 84b, against only one side 86b of the guide holder 56b, for example the side located in the direction of rotation 65, and is supported, by way of an opposite region of its lateral surface 84b, on a side 88b of the holder 58b that is located counter to the direction of rotation 65, movement of the rotation-blocking body 54 to an increasing extent in the radial direction in relation to the pivot axis 22 resulting in a torque 90, acting counter to the direction of rotation 65, to which the pivot-bearing body 14 is subjected.

Furthermore, the rotation-blocking body 54c butts, by way of its lateral surface 84c, against a side 86c of the guide holder 56c which is located counter to the direction of rotation 65 and acts, by way of an opposite region of the lateral surface 84c, on a side 89c of the first holder 58c, this resulting in a torque 92, acting in the direction of rotation 65, to which the pivot-bearing body 14 is subjected.

Figure 10:
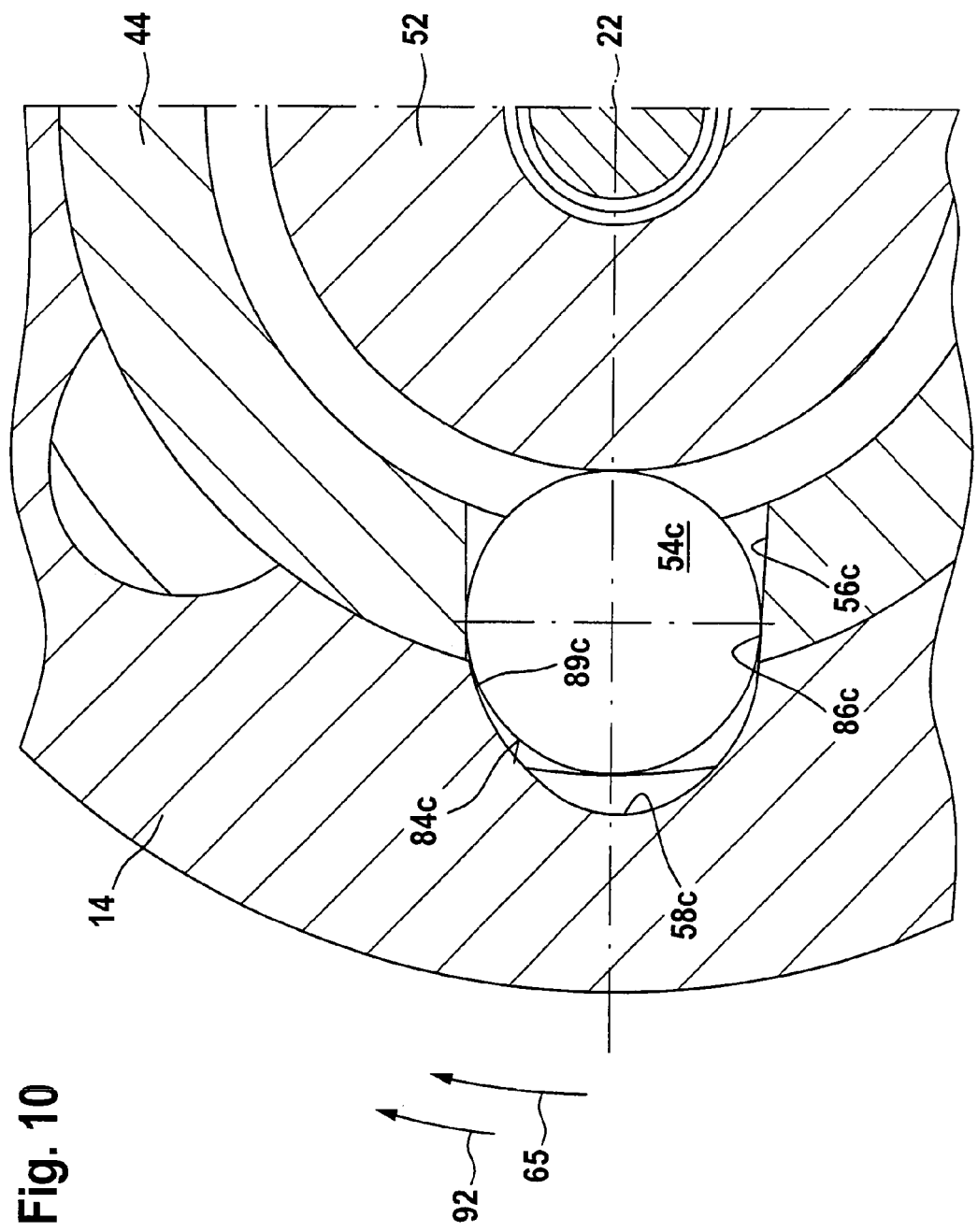
FIG. 10 shows an enlarged illustration, in detail form, of the rotation-blocking element 54*c*.

As is illustrated in FIG. 10, the torques 90 and 92 generated by the rotation-blocking bodies 54b and 54c thus act counter to one another and allow the pivot-bearing body 14 to be secured in a play-free manner relative to the guide body 40, in particular relative to the guide sleeve 44 of the same, since abutment of respectively one side of the rotation-blocking bodies 54, on the one hand, in the guide holder 56 and, on the other hand, in the first holder 58 eliminates the play between the guide holder 56 and the rotation-blocking body 54 and also the first holder 58 in the region of the two rotation-blocking bodies 54b and 54c.

Figure 11:
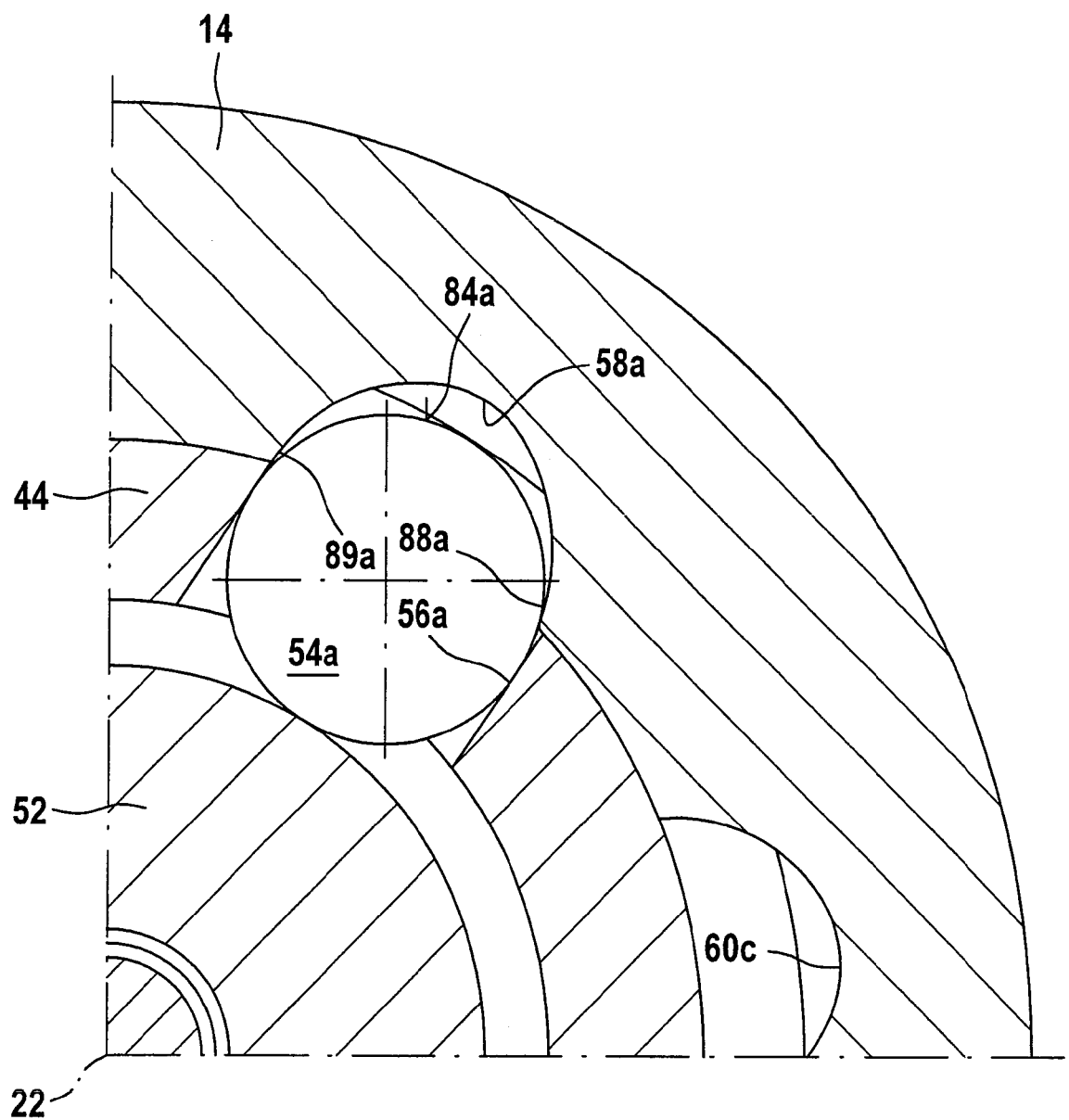
FIG. 11 shows an enlarged illustration, in detail form, of the rotation-blocking element 54*a*.

Provision is also made, as is illustrated in FIG. 11, for the lateral surface 84a of the rotation-blocking body 54a to butt both against the side 88a of the first holder 58a, this side being located in the direction of rotation 65, and against the side 89a of the first holder 58a, this side being located opposite the first-mentioned side, and thus, depending on the production tolerance in the region of the guide holder 56a and the corresponding holder 58a, and depending on the loading on the ball neck 10 during trailer operation, this rotation-blocking body usually contributes to one of the two torques 90 and 92 and thereby usually serves for absorbing load in addition to the rotation-blocking body 54b or 54c, which is loaded on account of the loading of the ball neck 10; it is also possible, however, to have a state in which the rotation-blocking body 54a cannot contribute to either of the two torques 90 and 92.

In order to make it possible for the actuating body 52 to act optimally on any of the three rotation-blocking bodies 54 in each case, it is provided that, in the active position, the actuating body 52 is centered in accordance with the position of the rotation-blocking bodies 54, so that the actuating body 52 can move relative to the pivot axis 22 and can center itself within the guide body 40 in accordance with the production-tolerance-induced position of the rotation-blocking bodies 54, it being possible for the self-centering of the actuating body 52 to differ slightly from a coaxial arrangement in relation to the geometric pivot axis 22.

On account of the self-centering, the rotation-blocking bodies 54a, 54b and 54c subject the holders 58a, 58b and 58c or 60*a*, 60*b* and 60*c* to approximately equal forces Ka, Kb and Kc in the respective guide direction 57*a*, 57*b* and 57*c*, so that it is also the case that the reaction forces RKa, RKb and RKc to which the actuating body 52 is subjected are approximately equal.

In the case of the illustrated exemplary embodiment of the solution according to the invention, the rotation-blocking bodies 54 are disposed in the guide holders 56 at equal angular spacings about the pivot axis 22, so that the reaction forces RKa, RKb, RKc to which one of the rotation-blocking bodies 54*a*, 54*b*, 54*c* are subjected, and which are approximately equal as a result of the self-centering, act equally on the other rotation-blocking bodies 54*b* and 54*c*, 54*a* and 54*c* and also 54*a* and 54*b* and thus cancel out one another overall, so that the actuating body 52 is in a state of equilibrium and does not require any additional support.

Figure 8:
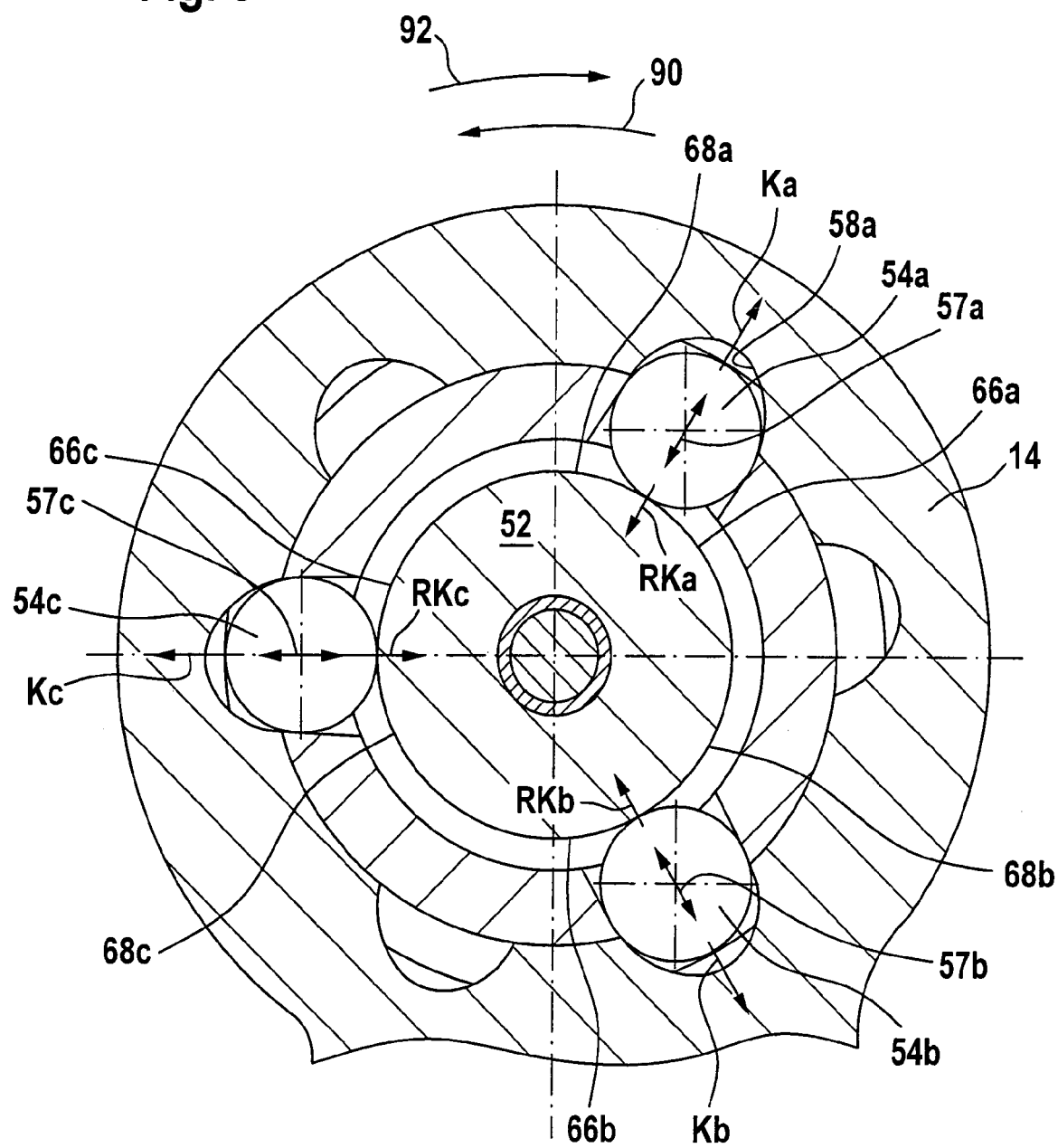
FIG. 8 shows an enlarged section corresponding to FIG. 5 with the pivot-bearing body blocked in a rotationally fixed manner by means of the rotation-blocking bodies.
Figure 9:
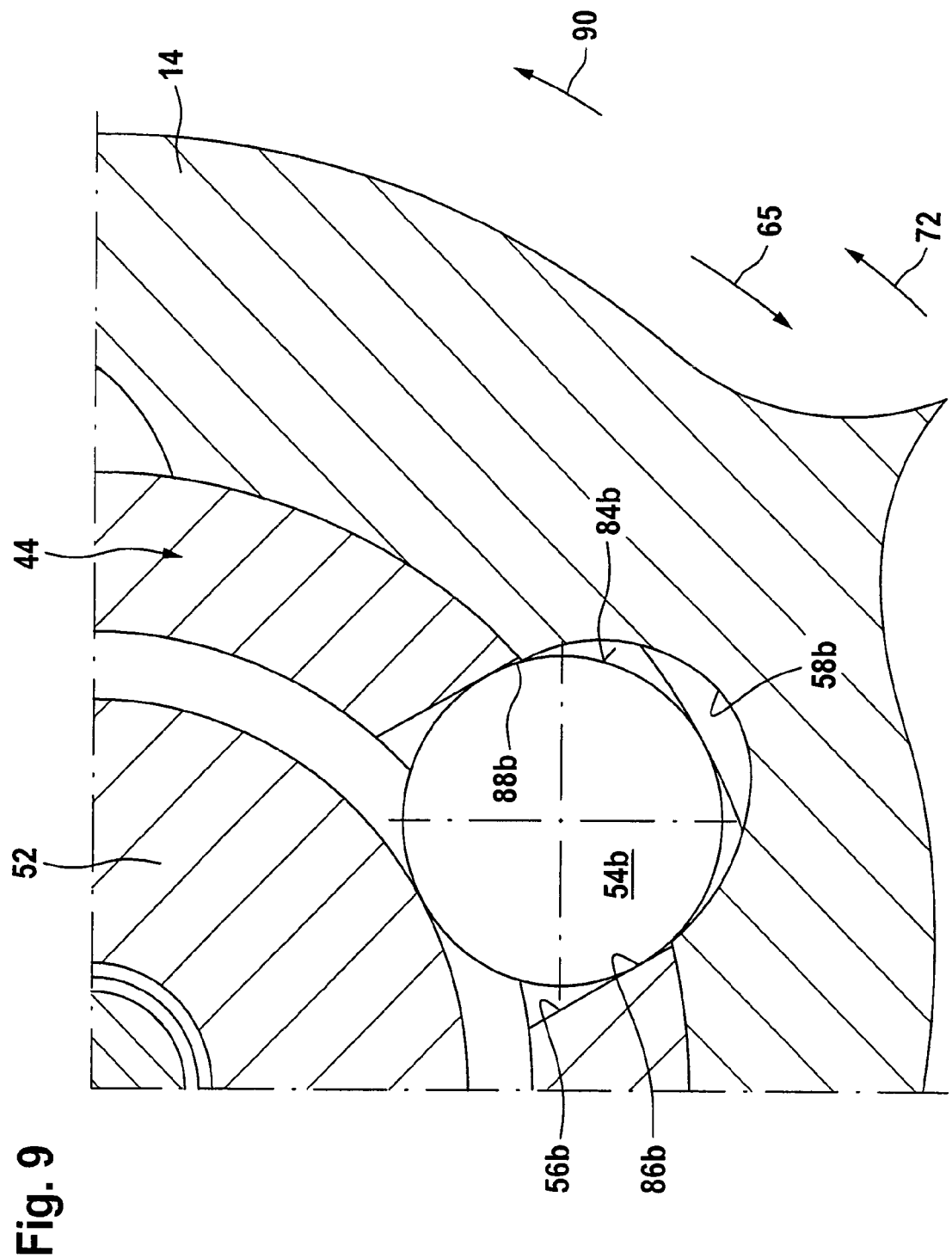
FIG. 9 shows an enlarged illustration, in detail form, of the rotation-blocking element 54*b*.

In the exemplary embodiment illustrated, the rotation-blocking bodies 54, as is illustrated in FIGS. 4, 6 and 8, are in the form of balls. It is also possible, however, for the rotation-blocking bodies to be formed, for example, as rollers.

For movement of the actuating body 52 in the axial direction 64, the actuating body is seated on a threaded spindle which is designated as a whole by 100 and is mounted on the carrying plate 26, for example via an axial/radial bearing 102, such that it cannot be displaced in the axial direction 64.

This threaded spindle 100 engages, by way of an external thread 104, in an internal thread 106 of the actuating body 54, which thus constitutes, at the same time, a spindle nut for the threaded spindle 100. It is possible for the self-centering of the actuating body 52 to be achieved by a sufficiently large amount of play between the external thread 104 and the internal thread 106.

Rotation of the threaded spindle 100 thus allows the actuating body 52 to be displaced in the axial direction 64.

The axial/radial bearing 102 is preferably formed such that, rather than guiding the threaded spindle 100 totally coaxially in relation to the pivot axis 22, it allows the threaded spindle 100 to yield transversely to the pivot axis 22, in order to bring about the abovedescribed self-centering of the actuating body 52 and the guide sleeve 44.

The threaded spindle 100 is driven via a drive wheel 110 which engages with a drive wheel 112 of a locking drive 114 and is seated on a side of the carrying plate 26 which is opposite the actuating body 52, the locking drive 114 being formed, for example, as an electric motor with a step-down transmission.

In order to pivot the pivot-bearing body 14, the latter is provided, for example, with an external toothing formation 120, in which a drive wheel 122 of a pivoting drive 124 engages. The locking and pivoting of the pivot-bearing body 14, then, can be controlled by a control means 130, namely, on the one hand, in that the pivoting drive 124 pivots the pivot-bearing body 14 between the pivoting positions corresponding to the operating position A and the rest position R and then, upon reaching the respective pivoting position of the locking drive 114, by displacement of the actuating body 52 between its freewheeling position and its rotation-blocking position, either unlocks or locks the pivot-bearing body 14 relative to the guide body 40 by displacement of the rotation-blocking bodies 54, as has already been described in detail.

Figure 12:
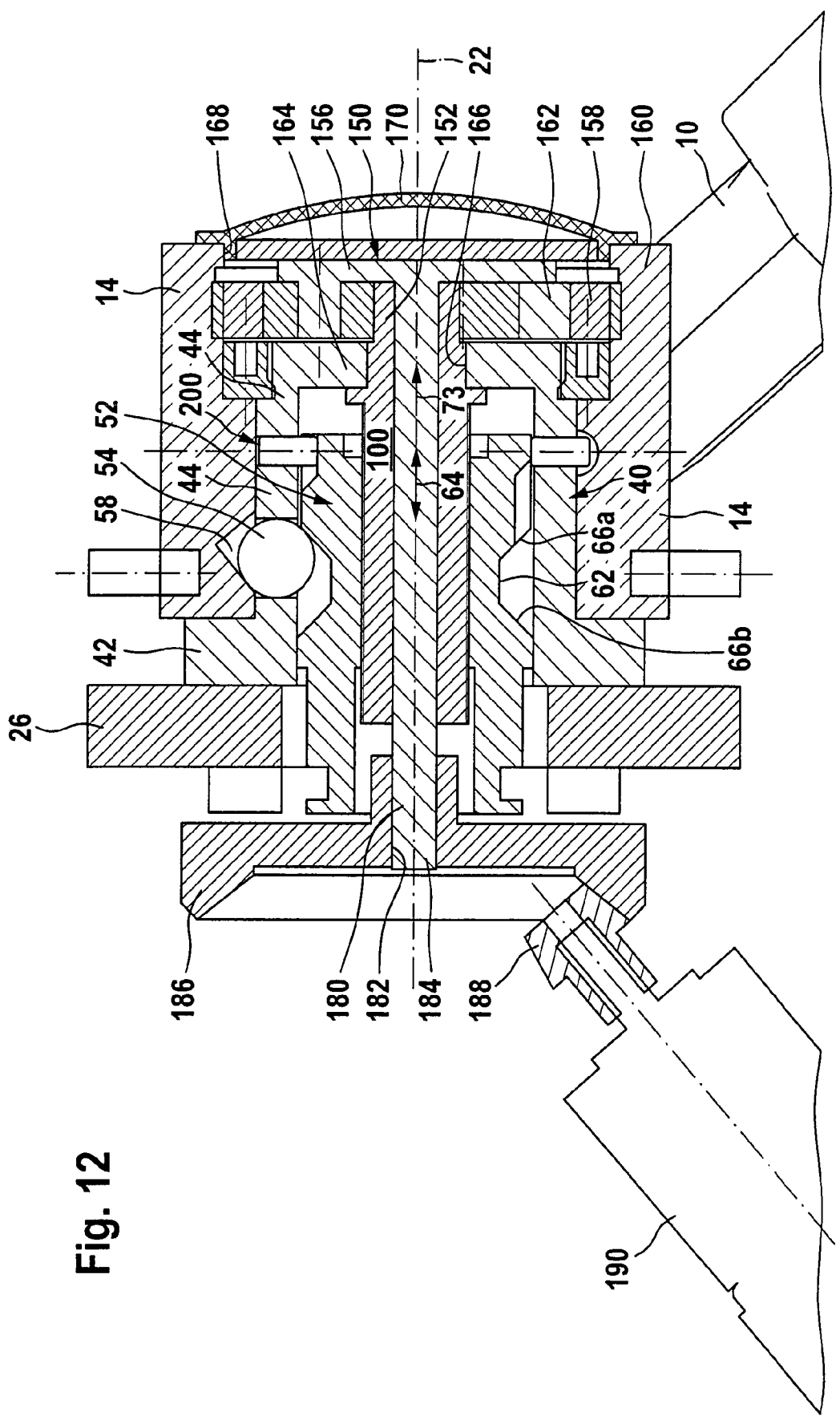
FIG. 12 shows a partial section, similar to FIG. 4, through a second exemplary embodiment of a trailer coupling according to the invention with the rotation-blocking body and actuating body located in a first rotation-blocking position.

In the case of a second exemplary embodiment of the trailer coupling according to the invention, illustrated in FIG. 12, those features which are identical to those of the first exemplary embodiment are provided with the same designations, so that reference can be made in full to the description thereof.

In contrast to the first exemplary embodiment, in the case of the second exemplary embodiment, the actuating body 52 is provided, on both sides of the retraction holder 62, with pressure-exerting surfaces 66*a* and 66*b* which widen, for example, conically outward in the radial direction in relation to the pivot axis 22 and by means of which the rotation-blocking bodies 54 can be moved radially outward. It is thus possible for a freewheeling position to be realized by the retraction holder 62, for a first rotation-blocking position to be realized by the pressure-exerting surfaces 66*a* and for a second rotation-blocking position to be realized by the pressure-exerting surfaces 66*b*.

Figure 13:
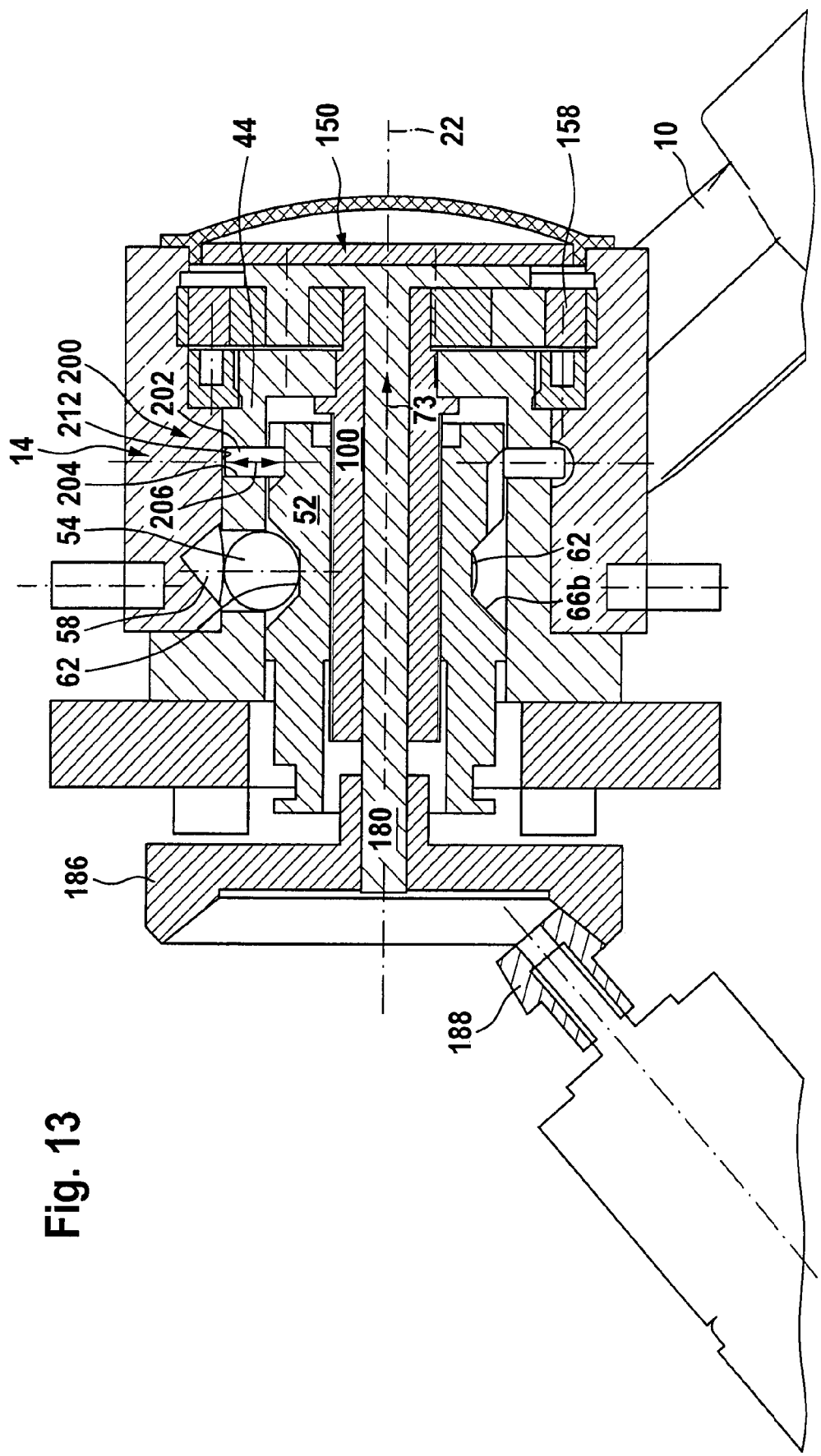
FIG. 13 shows a partial section, similar to FIG. 6, through the second exemplary embodiment of the trailer coupling according to the invention with the rotation-blocking body and actuating body located in the freewheeling position prior to a pivoting movement of the pivot-bearing body.

Starting from the first rotation-blocking position, illustrated in FIG. 12, in which the rotation-blocking bodies 54 have been forced radially outward into the holders 58 by the pressure-exerting surfaces 66, it is possible, by displacing the actuating body 52 in the axial direction 64, to be precise in a direction 73 away from the carrying plate 26, to release the state in which the pivot-bearing body 14 is locked by the first rotation-blocking position, namely in that, as is illustrated in FIG. 13, it is possible for the rotation-blocking bodies 54 to pass into the retraction holders 62 and thus into the freewheeling position, in which they move into the guide sleeve 44 to such an extent that the pivot-bearing body 14 can be rotated freely on the guide sleeve 44.

Figure 14:
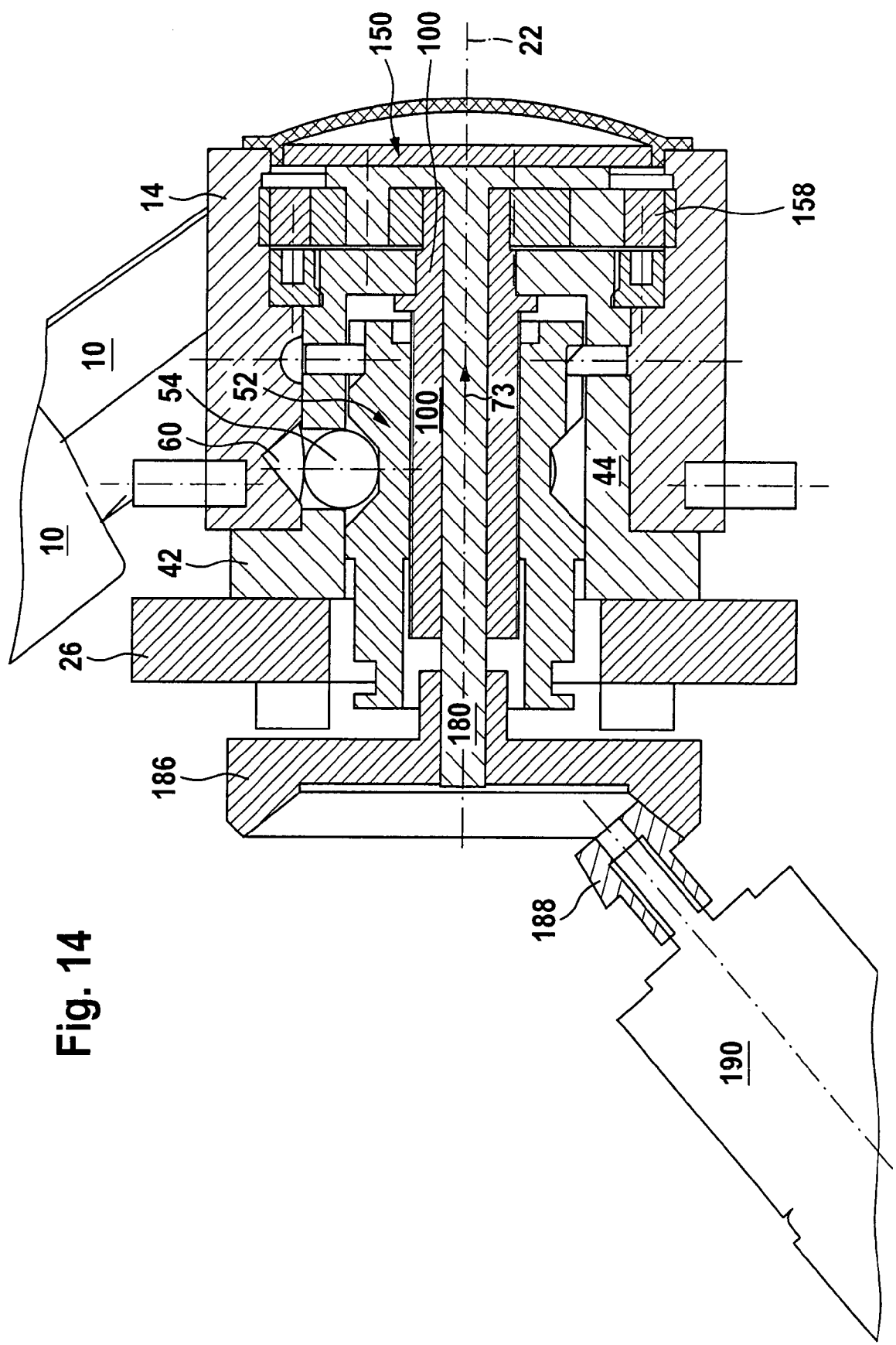
FIG. 14 shows a partial section, similar to FIG. 13, through the second exemplary embodiment of the trailer coupling according to the invention following a pivoting movement of the pivot-bearing body from an operating position into a rest position.
Figure 15:
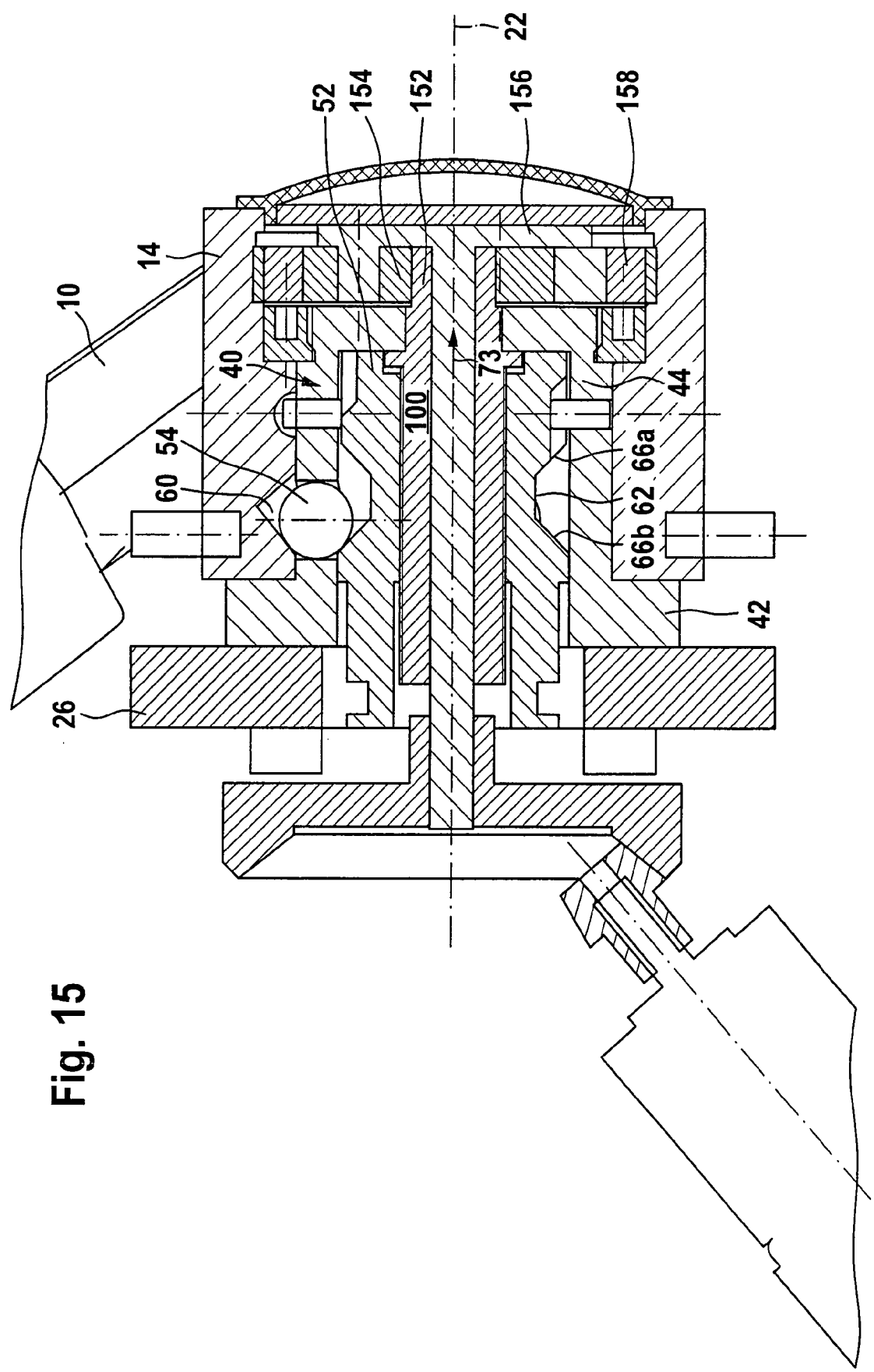
FIG. 15 shows a partial section, similar to FIG. 4, through the second exemplary embodiment of the trailer coupling according to the invention with the rotation-blocking body and actuating body located in a second rotation-blocking position.

In this unlocking position of the pivot-bearing body 14, the latter can be pivoted freely about the pivot axis 22, and it is possible to transfer, for example, the ball neck 10 from the operating position A, illustrated in FIG. 12, into the rest position R, in which the ball neck 10 extends substantially on a side of the pivot axis 22 which is opposite to that for the operating position A, as is illustrated in FIG. 14.

In this rest position R, it is then the holders 60, in turn, which are located opposite the rotation-blocking bodies 54 and it is possible, by virtue of the actuating body 52 being displaced further in the direction 73, to move the rotation-blocking bodies 54 by means of the pressure-exerting surfaces 66*b*, once again radially outward, into the holders 60 in order thus to attain, once again, the abovedescribed, positive locking of the pivot-bearing body 14 in relation to the guide sleeve 40 as a result of the second rotation-blocking position being reached.

In contrast to the first exemplary embodiment, the threaded spindle 100, rather than being driven directly via the locking drive 114, is driven via a planet gear mechanism 150, which is disposed on a side of the actuating body 52 which is directed away from the carrying plate 26.

The planet gear mechanism 150 comprises a sun wheel 152 which is connected in a rotationally fixed manner to the threaded spindle 100, and is preferably integrally formed thereon.

The sun wheel 152 is driven here by planet wheels 154 which are mounted in a rotatable manner on a planet-wheel carrier 156.

The planet wheels 154 mesh, on their radially inner side, with the sun wheel 152 and, on their radially outer side, with an internal ring gear 158, which is connected in a rotationally fixed manner to the pivot-bearing body 14.

For this purpose, that side of the pivot-bearing body 14 which is directed away from the carrying plate 26 preferably extends beyond the guide sleeve 44 by way of a sleeve-like portion 160, which encloses an inner chamber 162 in which the planet gear mechanism 150 is disposed.

The internal ring gear 158 of the planet gear mechanism 150 here is seated directly on an inner side of the sleeve-like portion 160 of the pivot-bearing body 14 and is connected thereto in a rotationally fixed manner.

The inner chamber 162, furthermore, is bounded in the direction of the carrying plate 26 by a termination wall 164 of the guide body 44, this wall carrying an axial and radial bearing 166 for bearing mounting of the threaded spindle 100, and is bounded at the other end by a cover 170, which closes an outer opening 168 of the sleeve-like portion 160 of the pivot-bearing body 14 and closes off the inner chamber 162 on a side of the planet gear mechanism 150 which is opposite to the termination wall 164.

The planet gear mechanism 150 is driven via a drive of the planet-wheel carrier 156, which is connected integrally to a drive shaft 180 which is guided, from the planet-wheel carrier 156, through a central bore 182 of the threaded spindle 100, and thus coaxially through the latter, and, from the inner chamber 162 through the threaded spindle 100, and thus also centrally through the actuating body 52, to a side of the carrying plate 26 which is opposite to the actuating body 52, and at its end 184, which is disposed on that side of the carrying plate which is opposite to the actuating body 52, it carries a drive wheel 186 which meshes with an output wheel 188 of an overall drive 190.

The planet gear mechanism 150, then, allows changeover between a drive of the pivot-bearing body 14, by driving of the internal ring gear 158, and a drive of threaded spindle 100, by driving of the sun wheel 152, by way of the planet wheels 154, which can be moved in rotation about the pivot axis 22 by virtue of the planet-wheel carrier 156 being rotated by means of the overall drive 190.

The changeover between a drive of the threaded spindle 100 and a drive of the internal ring gear 158 takes place here—as is conventional for a planet gear mechanism—in dependence on whether rotary movement of the internal ring gear 158 or rotary movement of the sun wheel 152 has been blocked.

In the locked position of the pivot-bearing body 14, illustrated in FIG. 12, the internal ring gear 158 has been blocked in respect of rotary movement about the pivot axis 22 since the pivot-bearing body 14, which is connected in a rotationally fixed manner to the internal ring gear 158, is secured in a rotationally fixed manner on the guide body 40 by the rotation-blocking bodies 54, and the latter being seated on the pressure-exerting surfaces 66a of the actuating body 52, which is located in its first rotation-blocking position.

For this reason, driving of the planet-wheel carrier 156 results in rotary movement of the sun wheel 152 along with the reduction ratio which is conventional for a planet gear mechanism, so that the threaded spindle 100 can thus be driven such that it moves the actuating body 52 in the direction 73, to be precise until, as is illustrated in FIG. 13, in the freewheeling position of the actuating body 52, the rotation-blocking bodies 54 rest on the retraction holder 62. The rotation-blocking bodies 54 thus release the rotary movement of the pivot-bearing body 14 relative to the guide body 40, and the latter is then capable of rotating about the pivot axis 22, as a result of which it is also the case that the internal ring gear 158, rather than remaining rotationally fixed, is likewise able to rotate.

In order for the pivot-bearing body 14 to be able to execute a defined pivoting movement in this freewheeling position of the actuating body 52 and of the rotation-blocking bodies 54, a first inhibiting arrangement, designated as a whole by 200, is also provided.

The first inhibiting arrangement 200 comprises, as is illustrated in FIGS. 12 to 19, an inhibiting body 202 which can be moved in a guide direction 206, preferably running radially in relation to the pivot axis 22, in a guide holder 204 of the guide sleeve 44 and interacts with an inner guide track 210, which is provided on the actuating body 52, and an outer guide track 212, which is disposed on the pivot-bearing body 14.

The inner guide track 210, provided in a radially outer region of the actuating body 52, is formed, in part, as a radial recess in the actuating body 52 and comprises an inner sliding surface 220, running parallel to the axial direction 64 on the recess base, an inhibiting surface 222, running radially outward to an increasing extent obliquely in relation to the inner sliding surface, and an outer sliding surface 224, which adjoins the inhibiting surface 222 and, in the simplest case, is formed by a lateral region of the actuating body 52.

Figure 16:
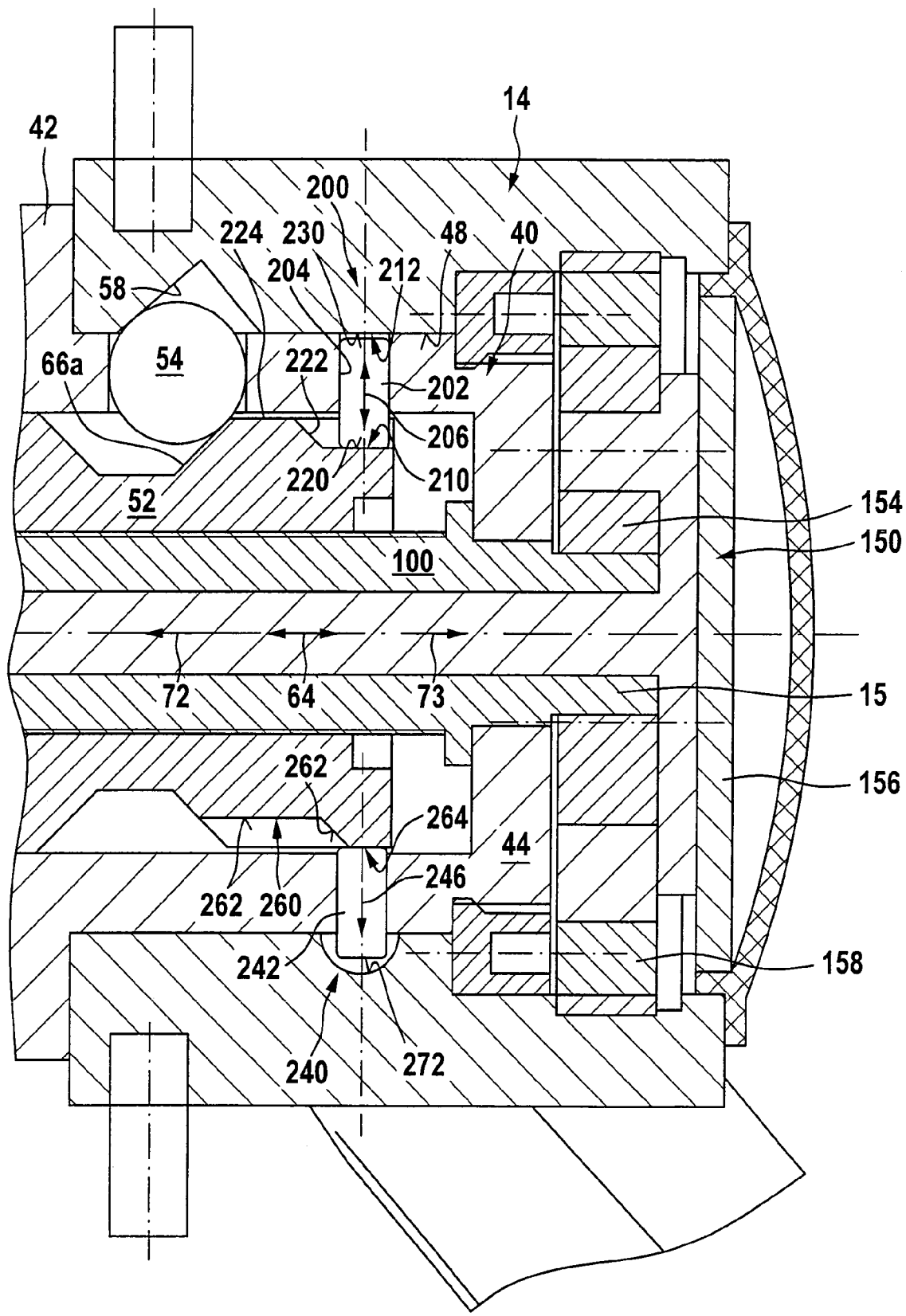
FIG. 16 shows an enlarged sectional illustration in the region of a rotation-blocking arrangement and of inhibiting arrangements corresponding to the state in FIG. 12.
Figure 17:
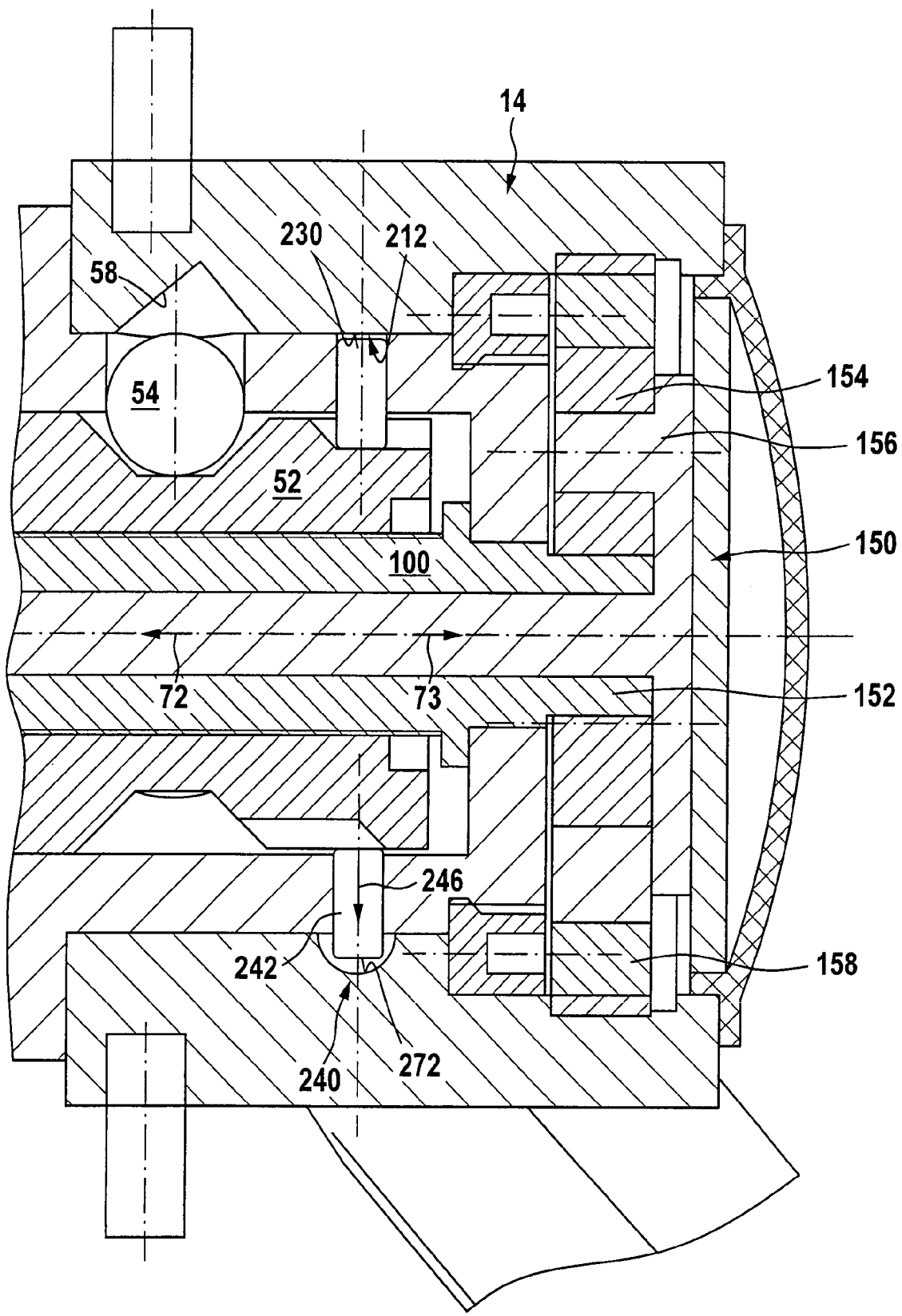
FIG. 17 shows a sectional illustration similar to FIG. 16, this time corresponding to the state in FIG. 13.

The outer guide track 212 comprises a sliding surface 230 which is formed by a sub-region of the inner surface 48 of the pivot-bearing body 14, and is illustrated in FIGS. 16 and 17, and also comprises a depression 232 which adjoins the sliding surface 230, runs radially outward in relation to the pivot axis 22 and is located opposite the inhibiting body 202 only when the pivot-bearing body 14 is located in a defined pivoting position, for example in the rest position.

The first inhibiting arrangement 200, then, functions, as is illustrated in FIGS. 16 to 19, which corresponds to FIGS. 12 to 15, such that the inhibiting body 202, in the first rotation-blocking position, is disposed with a small amount of play between the inner sliding surface 220 of the inner guide track 210 and the sliding surface 230 of the outer guide track 212.

Figure 18:
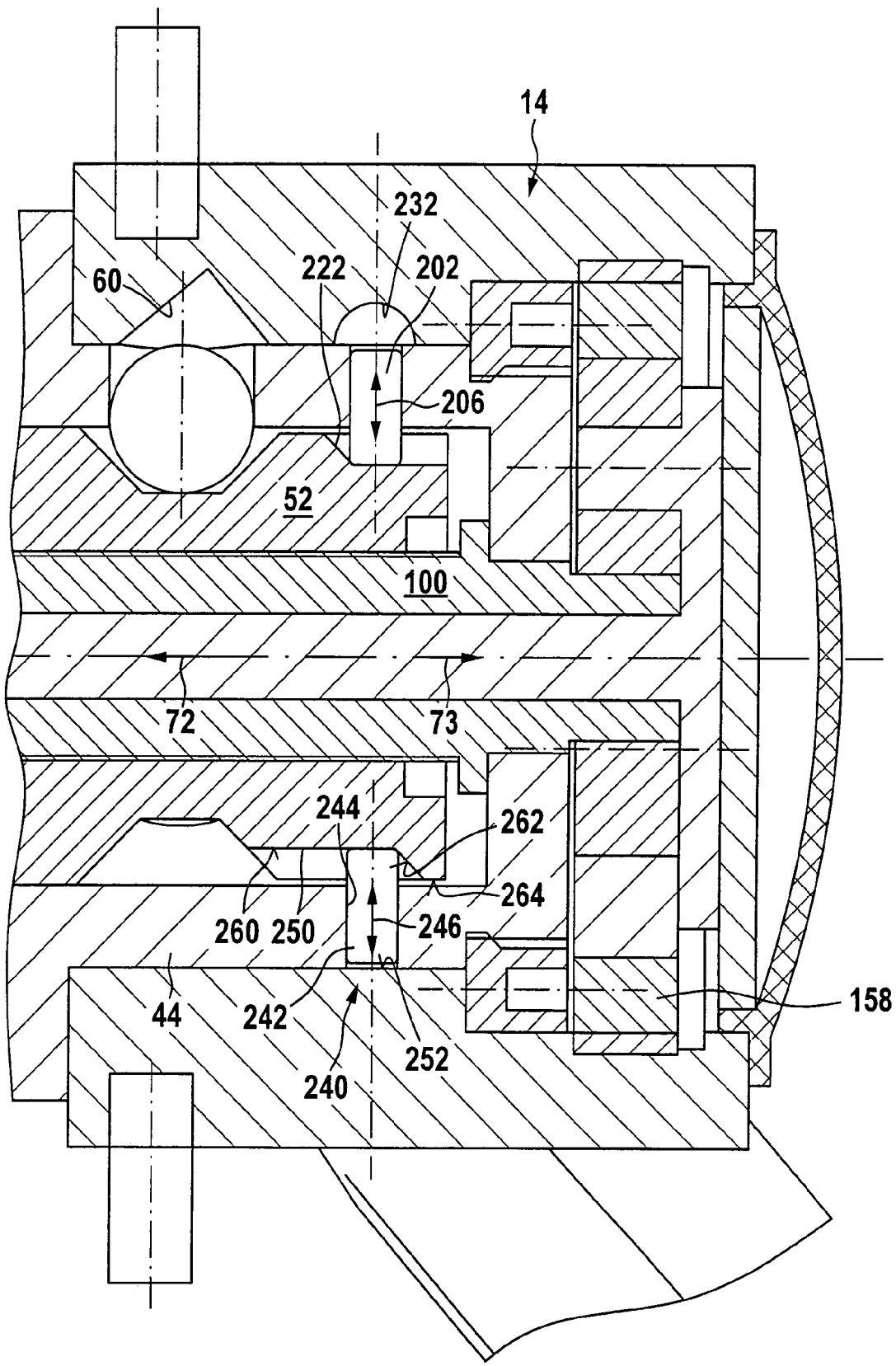
FIG. 18 shows a sectional illustration similar to FIG. 16, this time corresponding to the state in FIG. 14.

The inner sliding surface 220, then, is of such a length that the actuating body 52 can be moved from the first rotation-blocking position, illustrated in FIG. 16, into the freewheeling position, illustrated in FIGS. 17 and 18, without the inhibiting body 202 reaching the inhibiting surface 222 of the inner guide track 210.

The inhibiting body 202 comes into contact, as is illustrated in FIGS. 17 and 18, with the inhibiting surface 222 of the inner guide track 210 when the actuating body 52 is located in the freewheeling position, as is illustrated in FIGS. 17 and 18. In the freewheeling position, the inhibiting surface 222 comes into abutment against the inhibiting body 202 and further displacement of the actuating body 52 in the direction 73 beyond the freewheeling position, in the direction of the second rotation-blocking position, would make it necessary for the inhibiting body 202, on account of interacting with the inhibiting surface 222, to have the possibility to move outward in its guide direction 206, radially in relation to the pivot axis 22. This movement of the inhibiting body 202, however, is blocked by the sliding surface 230 of the outer guide track 212 until the pivot-bearing body 14 has been pivoted about the pivot axis 22 to the extent where the inhibiting body 202 is located opposite the depression 232 of the outer guide track 212.

As long as this is not the case, the inhibiting body 202, by interacting with the inhibiting surface 222 upon displacement of the actuating body 52 from the first rotation-blocking position into the freewheeling position, inhibits in this freewheeling position, as is illustrated in FIG. 17, any further displacement movement of the actuating body 52 in the direction 73, and this results in the rotary movement of the threaded spindle 100, and thus in the rotary movement of the sun wheel 152, being blocked.

As driving of the planet gear mechanism 150 by the overall drive 190 continues, the blocking of the sun wheel 152 means that the internal ring gear 158 can be driven in rotation by the rotating planet wheels 154, and such rotary movement of the internal ring gear 158 is possible in that the actuating body 52 and thus also the rotation-blocking bodies 54 are located in the freewheeling position and release the rotary movement of the pivot-bearing body 14.

When the freewheeling position is reached, continued operation of the overall drive 190 thus results exclusively in a pivoting movement of the pivot-bearing body 14, for example from the operating position A into the rest position R, and, in this rest position, the depression 232, as is illustrated in FIG. 18, is then located opposite the outer guide track 212.

Figure 19:
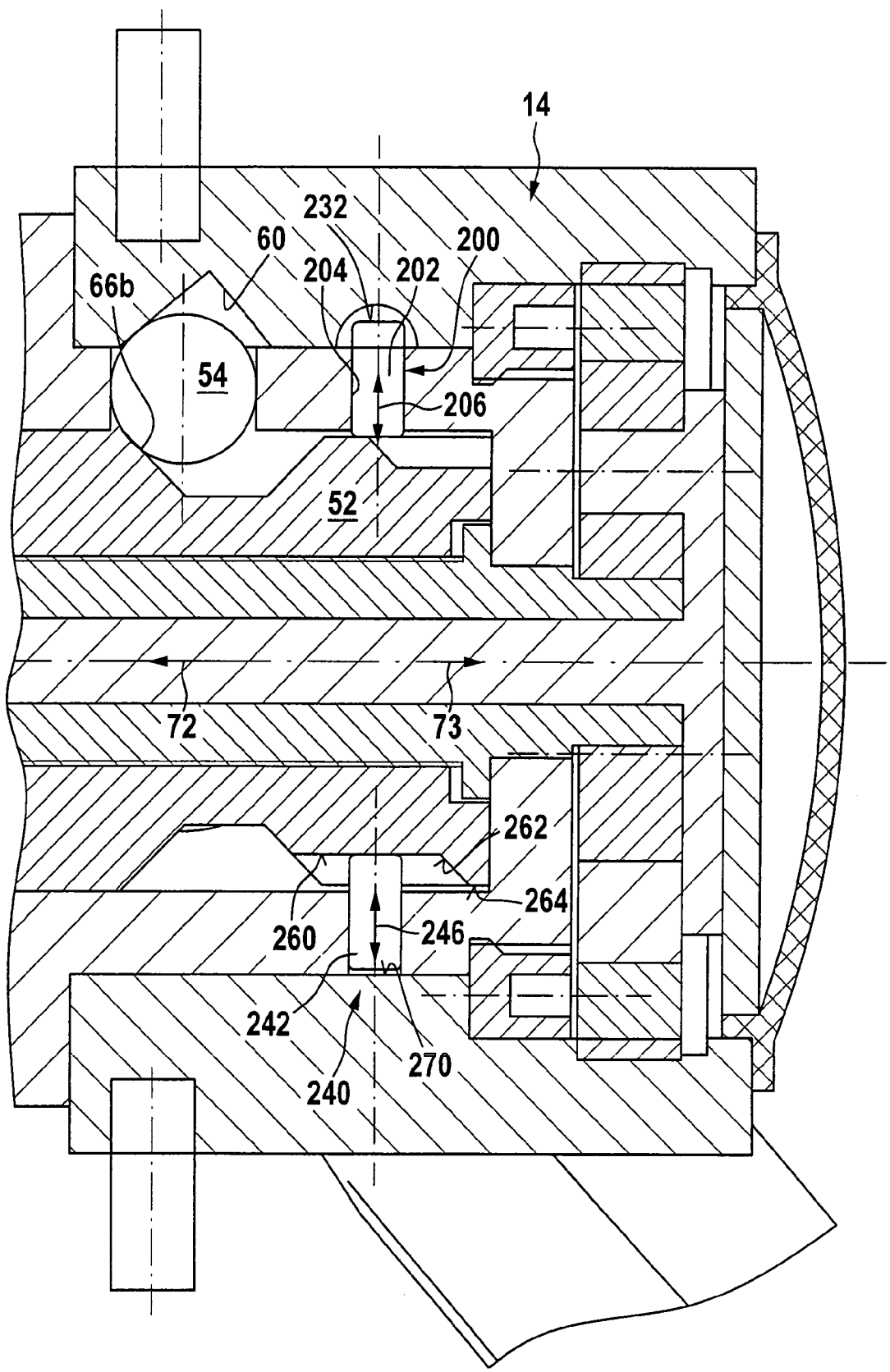
FIG. 19 shows a sectional illustration similar to FIG. 16, this time corresponding to the state in FIG. 15.

At this moment in time, the inhibiting action of the inhibiting body, interacting with the inhibiting surface 222 of the inner guide track 210, is eliminated since the inhibiting body 202 moves radially outwards in its guide direction 206, by sliding along the inhibiting surface 222, and can reach the outer sliding surface 224. This allows, as is illustrated in FIGS. 18 and 19, further displacement of the actuating body 52 in the direction 73, so that the actuating body 52 can transfer from the freewheeling position into the second rotation-blocking position, in which the pressure-exerting surfaces 66b move the rotation-blocking bodies 54 into the holders 60 and thus lock the pivot-bearing body 14 in a rotationally fixed manner.

The first inhibiting arrangement 200 thus has the task of inhibiting, in the freewheeling position, the displacement movement of the actuating body 52, during transfer from the first rotation-blocking position into the freewheeling position, until a pivoting movement of the pivot-bearing body 14 from the operating position A into the rest position R has taken place, and of allowing the displacement movement of the actuating body 52 in the direction 73 to be continued again only when the pivoting movement of the pivot-bearing body 14 from the operating position A into the rest position R has been completed.

If then, in the rest position R, the locking of the pivot-bearing body 14 is to be released again, and the pivot-bearing body is to be rotated back into the operating position A from the rest position R, and locked in the operating position A, the direction of rotation of the overall drive 190 is switched over and the actuating body 52 is displaced in the direction 72. In this case, starting from the second rotation-blocking position, which locks the pivot-bearing body 14 in the rest position R, the freewheeling position, which is illustrated in FIG. 18 and in which the locking of the pivot-bearing body 14 is released, is reached initially.

In order then, in this position, to prevent the threaded spindle 100 from displacing the actuating body 52 any further in direction 72, in the direction of the first rotation-blocking position, a second inhibiting arrangement 240 is provided, this likewise having an inhibiting body 242, which is guided in a guide holder 244 in the guide sleeve 44 and can be moved radially in relation to the pivot axis in a guide direction 246.

It is also the case that the second inhibiting arrangement comprises an inner guide track 250 and an outer guide track 252, in which case the inner guide track 250, in a manner analogous to the first inhibiting arrangement, has an inner sliding surface 260, an inhibiting surface 262 and an outer sliding surface 264, likewise provided in a radially outer region of the actuating body 52 which is disposed on the actuating body 52, for example, at an angular spacing apart from the first inhibiting arrangement 200, preferably opposite the latter.

Furthermore, the outer guide track 252 of the second inhibiting arrangement 240 has a sliding surface 270 and a depression 272, the depression 272 being located opposite the inhibiting body 242 only when the pivot-bearing body 14 is located in its operating position and the sliding surface 270 is otherwise operative.

Upon movement of the actuating body 52 in the direction 72, then, the second inhibiting arrangement 240 takes effect in a manner analogous to the first inhibiting arrangement 200, that is to say, following movement of the actuating body 52 from the second rotation-blocking position into the release position, any further movement of the actuating body 52 in this direction is inhibited, and the rotary movement of the threaded spindle 100 and of the sun wheel 152 is thus inhibited, so that on account of the pivot-bearing body 14 being in the freewheeling position, without any locking, as is illustrated in FIG. 18, the planet wheels 154, which continue to be driven by the overall drive 190, drive the internal ring gear 158 and thus pivot the pivot-bearing body 14 from the rest position R into the operating position A.

Upon reaching the operating position A of the pivot-bearing body 14, the depression 272 is located opposite the inhibiting body 242, so that it is then possible for the latter, under the action of the inhibiting surface 262, to yield outward radially in relation to the pivot axis 22 in its guide direction 246, as is illustrated in FIG. 17.

The action of inhibiting the movement of the actuating body 52 in the direction 72 is thus eliminated and the planet gear mechanism 150 continues driving the threaded spindle 100 via the sun wheel 152, so that this threaded spindle can displace the actuating body 52 further, in the direction 72, in the direction of its first rotation-blocking position, in which the rotation-blocking bodies 54 pass into the rotation-blocking position again and engage in the holders 58, in order to lock the pivot-bearing body 14 in the operating position A.

Furthermore, during the pivoting movement of the pivot-bearing body 14 from the rest position R into the operating position A, the first inhibiting body 202 of the first inhibiting arrangement 200 leaves the depression 232 and slides further along the sliding surface 230 of the outer guide track 212.

The inhibiting bodies 202 and 242 of the inhibiting arrangements 200 and 240 may be formed in a wide variety of different ways. For example, the inhibiting bodies 202 and 242, as is illustrated in FIGS. 16 to 19, may be cylindrical pins. It is also conceivable, however, to form the inhibiting bodies 202 and 242, in a manner similar to the rotation-blocking bodies 54, as balls and to adapt the shape and profile of the inner guide tracks 210 and 250 and the outer guide tracks 212 and 252 correspondingly.

The solution according to the second exemplary embodiment of the invention thus makes it possible to use an overall drive 190 and to operate the overall drive, by virtue of the planet gear mechanism 150 being driven in a single direction of rotation, first of all to release the locking of the pivot-bearing body 14 in relation to the guide body 40, to pivot the pivot-bearing body 14 from one rotary position, for example the operating position A or the rest position R, into the respectively other rotary position, for example the rest position R or the operating position A, and, in this respectively other rotary position, to lock the pivot-bearing body 14, once again, relative to the guide body 40.

By a straightforward changeover of the direction of rotation of the overall drive, it is then possible once again, in the other rotary position, for example the rest position R or the operating position A, to release the locking of the pivot-bearing body 14 relative to the guide body 40, to pivot the pivot-bearing body 14 back from the other rotary position into the one rotary position, for example the operating position A or the rest position R, and, in this respective rotary position, to lock the pivot-bearing body 14 once again relative to the guide body 40.

The only circuit-related measure for such an exemplary embodiment of the solution according to the invention is thus that of energizing the overall drive in the direction of rotation which is necessary in each case, the direction of rotation which should be selected when the overall drive 190 is switched on clearly being correlated with the respective rotary position in which the pivot-bearing body 14 is located and has been blocked.

In the case of the second exemplary embodiment, the holders 58 and 60 are preferably formed as conical holders, so that, as can be seen in FIGS. 16 and 19, rotation-blocking bodies 54 penetrating into these holders, by interacting with the conical holder 58 or 60, subject the pivot-bearing body 14 to a force which acts in the direction of the flange 42, and thus forces the pivot-bearing body against the flange 42.

In the case of a third exemplary embodiment, illustrated in FIGS. 20 to 24, those parts which are identical to those of the first and of the second exemplary embodiments are provided with the same designations, so that, in respect of the description thereof, reference can be made in full to what has been said in relation to these exemplary embodiments.

In contrast to the second exemplary embodiment, the third exemplary embodiment provides a single inhibiting arrangement 300 which combines the functions of the first inhibiting arrangement 200 and of the second inhibiting arrangement 240.

The inhibiting arrangement 300 here comprises an inhibiting body 302 which can be moved in a guide holder 304 of the guide sleeve 44, in this case of the flange 42 of the guide holder 44, in a guide direction 306, preferably likewise running radially in relation to the pivot axis 22, and interacts with an inner guide track 310, which is provided on the actuating body 52, and an outer guide track 312, which is disposed on the pivot-bearing body 14, by way of an auxiliary body 314, which interacts with an auxiliary guide means 316 on the inhibiting body 302.

The inner guide track 310 here is provided in a radially outer region of the actuating body 52 and has a radially sunken surface region 220 and inhibiting surfaces 322a and 322b, running radially outward to an increasing extent obliquely in relation to the surface region 220, and, on sides of the inhibiting surfaces 322a and 322b which are opposite to the surface region 320, radially outer sliding surfaces 324a and 324b, which adjoin these inhibiting surfaces 322a and 322b and, in the simplest case, are formed by a lateral region of the actuating body 52.

The outer guide track 312 is provided on an end surface 326 of the pivot-bearing body 14, this end surface being directed toward the flange 42, and comprises a sliding surface 330, formed by the end surface 326, and depressions 332a and 332b which are located in the azimuthal direction on both sides of this sliding surface 330 and extend into the pivot-bearing body, away from the flange 42.

The inhibiting arrangement 300, then, functions, as is illustrated in FIGS. 20 to 24, such that, with the ball neck 10 located in the operating position, the inhibiting body 302, in the first rotation-blocking position of the actuating body 52, is seated on the sliding surface 324b, and in this position, the auxiliary guide means 316 causes the auxiliary body 314 to penetrate into the depression 332b of the outer guide track 312 and thus block a rotary movement of the pivot-bearing body 14, as is likewise the case with the functioning of the second inhibiting arrangement 240 in the second exemplary embodiment.

Figure 21:
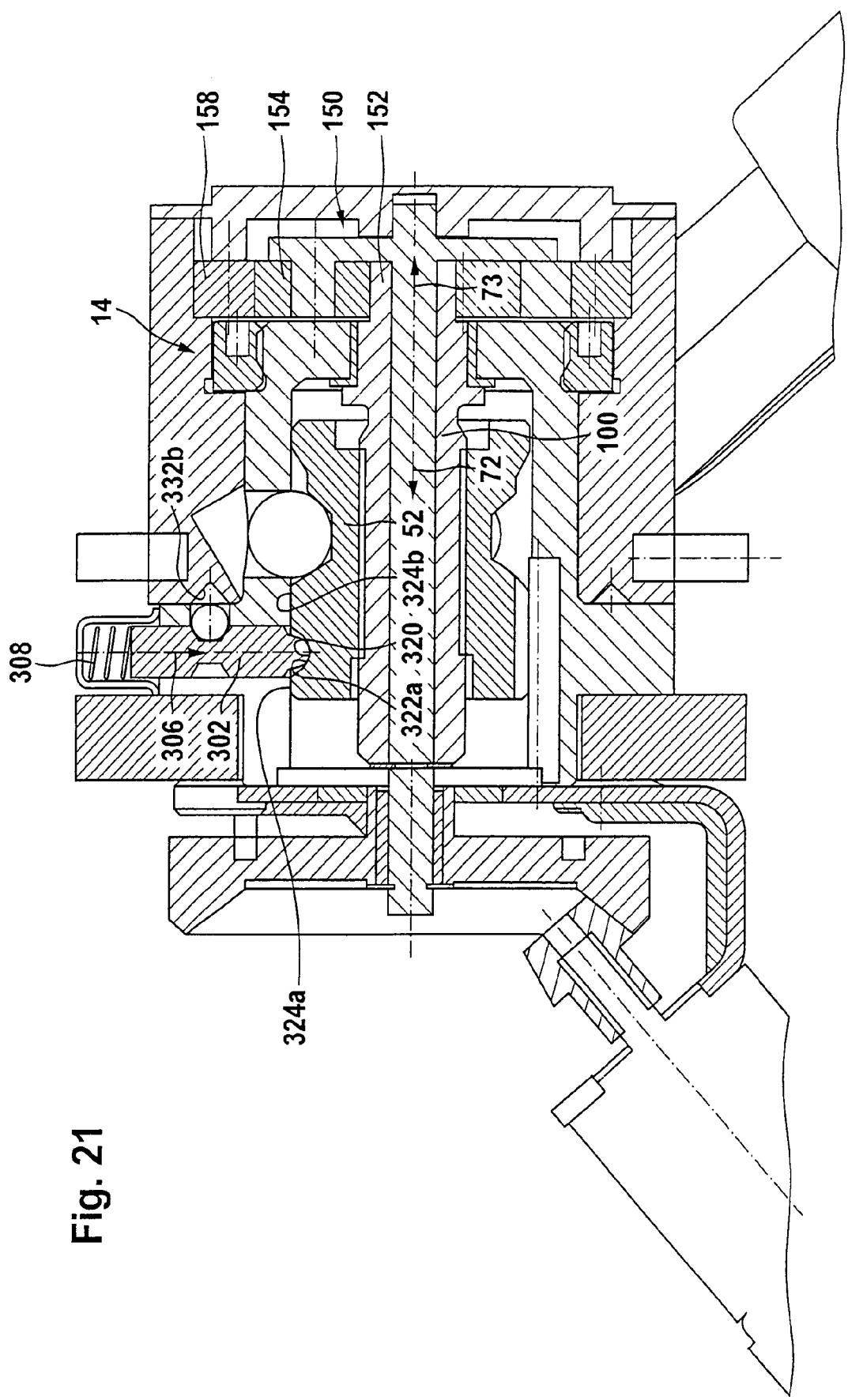
FIG. 21 shows a partial section, similar to FIG. 6, through the third exemplary embodiment of the trailer coupling according to the invention with a rotation-blocking body and actuating body located in the freewheeling position prior to a pivoting movement of the pivot-bearing body, with the inhibiting arrangement coming into operation.

If, then, the actuating body 52 is moved into the freewheeling position, as is illustrated in FIG. 21, this also means that, in the freewheeling position, the inhibiting body 302 penetrates into the radially sunken surface region 220, and the movement of the auxiliary guide means 316 and of the auxiliary body 314 thus results in the pivot-bearing body 14 being released for a rotation.

In this position, then, the pivot-bearing body 14 is able to rotate about the pivot axis 22, since neither the rotation-blocking bodies 54 nor the auxiliary body 314 obstruct the rotary movement.

Further movement of the actuating body 52 in the direction 73 results in the inhibiting body 302 coming into abutment against the inhibiting surface 322a which, on account of its profile, has the tendency to displace the inhibiting body 302 radially outward, to be precise counter to the force action of an inhibiting spring 308, which forces the inhibiting body 302 in the direction of the actuating body 52.

The inhibiting spring 308 and the inhibiting body 302 thus inhibit the actuating body 52, in the freewheeling position, from moving any further in direction 73, which results in the rotary movement of the threaded spindle 100 being inhibited, and thus in the rotary movement of the sun wheel 152 being inhibited, so that, on account of the sun wheel 152 being inhibited, the planet gear mechanism 150, which continues to be driven by the overall drive 190, causes the internal ring gear 158 to be driven in rotation by the rotating planet wheels 154.

Pivoting of the pivot-bearing body 14 then results in the depression 332b moving away from its position opposite the auxiliary body 314 and in the sliding surface 330 being located opposite the auxiliary body 314, so that the auxiliary body 314, for its part, interacts with the auxiliary guide means 316 and thus blocks a movement of the inhibiting body 302 in the direction away from the actuating body 52, so that the inhibiting action of the inhibiting body 302 in respect of movement of the actuating body 52 in direction 73 is maintained by a positive fit, namely between the auxiliary body 314 and the auxiliary guide means 316, during the pivoting movement of the pivot-bearing body 14 and need not be maintained just by the inhibiting spring 308 alone.

Figure 22:
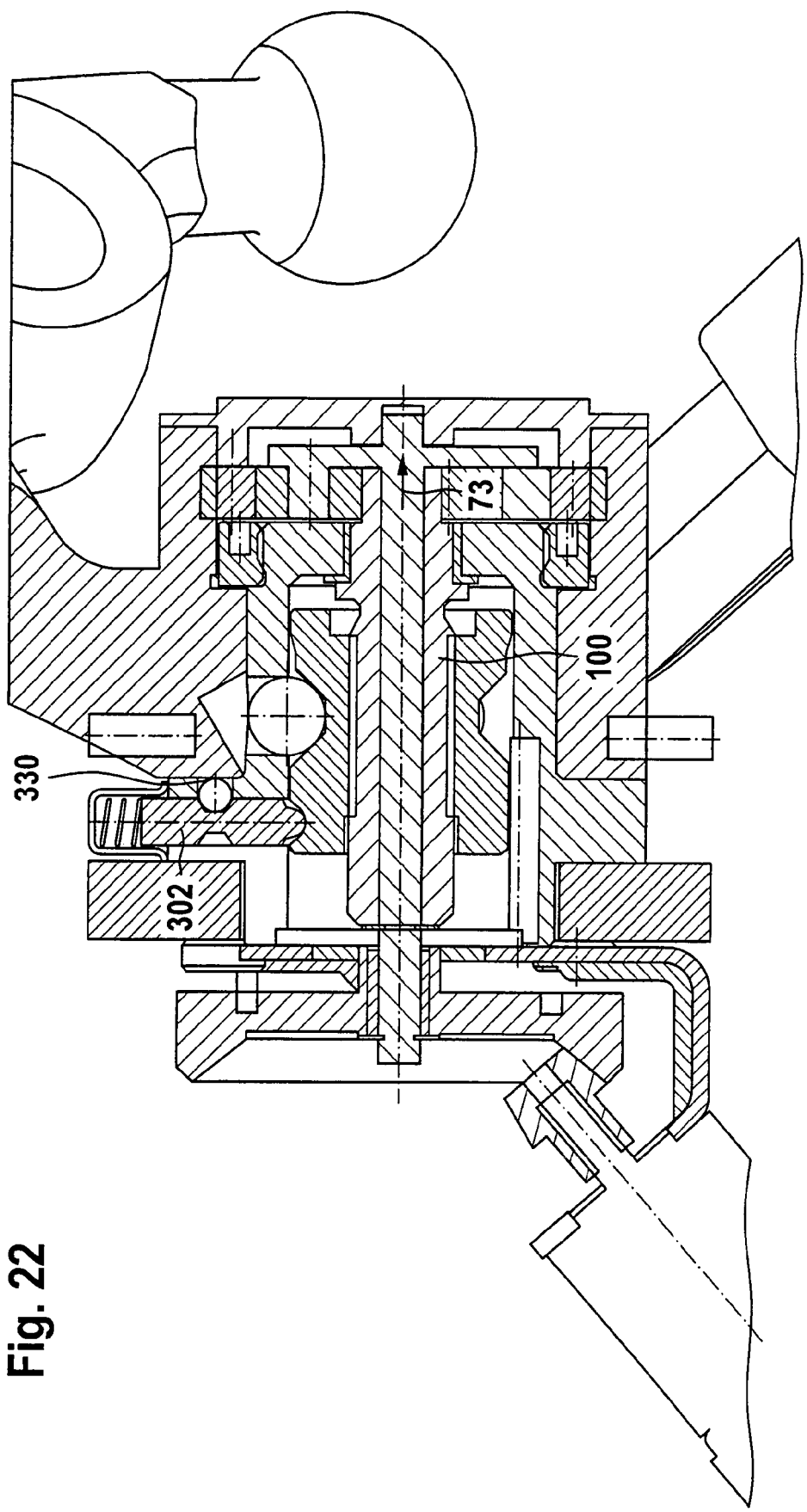
FIG. 22 shows a partial section through the third exemplary embodiment of the trailer coupling according to the invention, during the pivoting movement, with the rotation-blocking body and actuating body located in the freewheeling position and the inhibiting arrangement fully operative.
Figure 23:
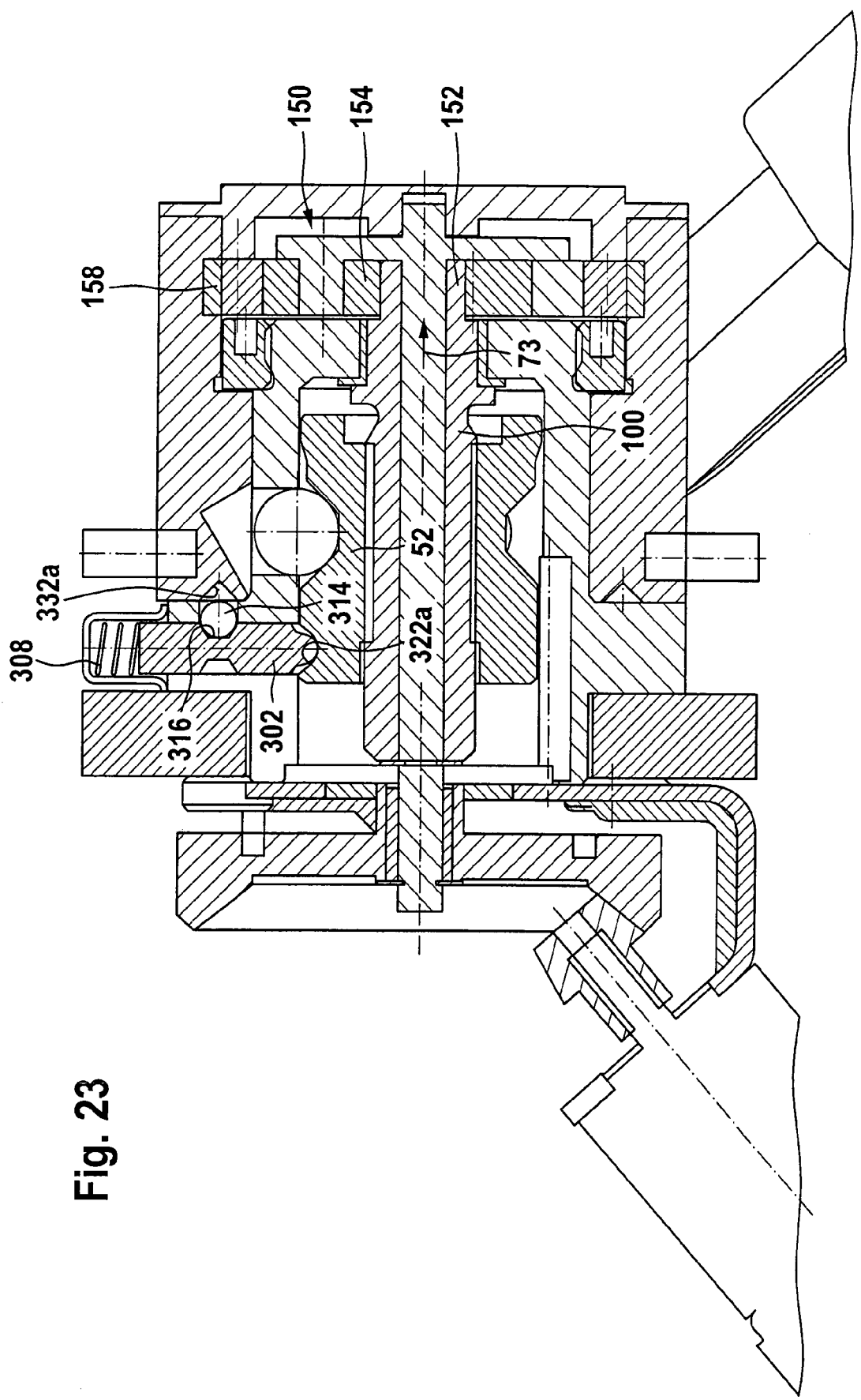
FIG. 23 shows a partial section, similar to FIG. 13, through the third exemplary embodiment following a pivoting movement of the pivot-bearing body from an operating position into a rest position.

This state of the inhibiting body 302, illustrated in FIG. 22, is maintained until the rest position R, in which the depression 332a is located opposite the auxiliary body 314, is reached.

Furthermore, a stop (not illustrated in the drawings), terminates the pivoting movement of the pivot-bearing body 14 in the rest position.

Figure 24:
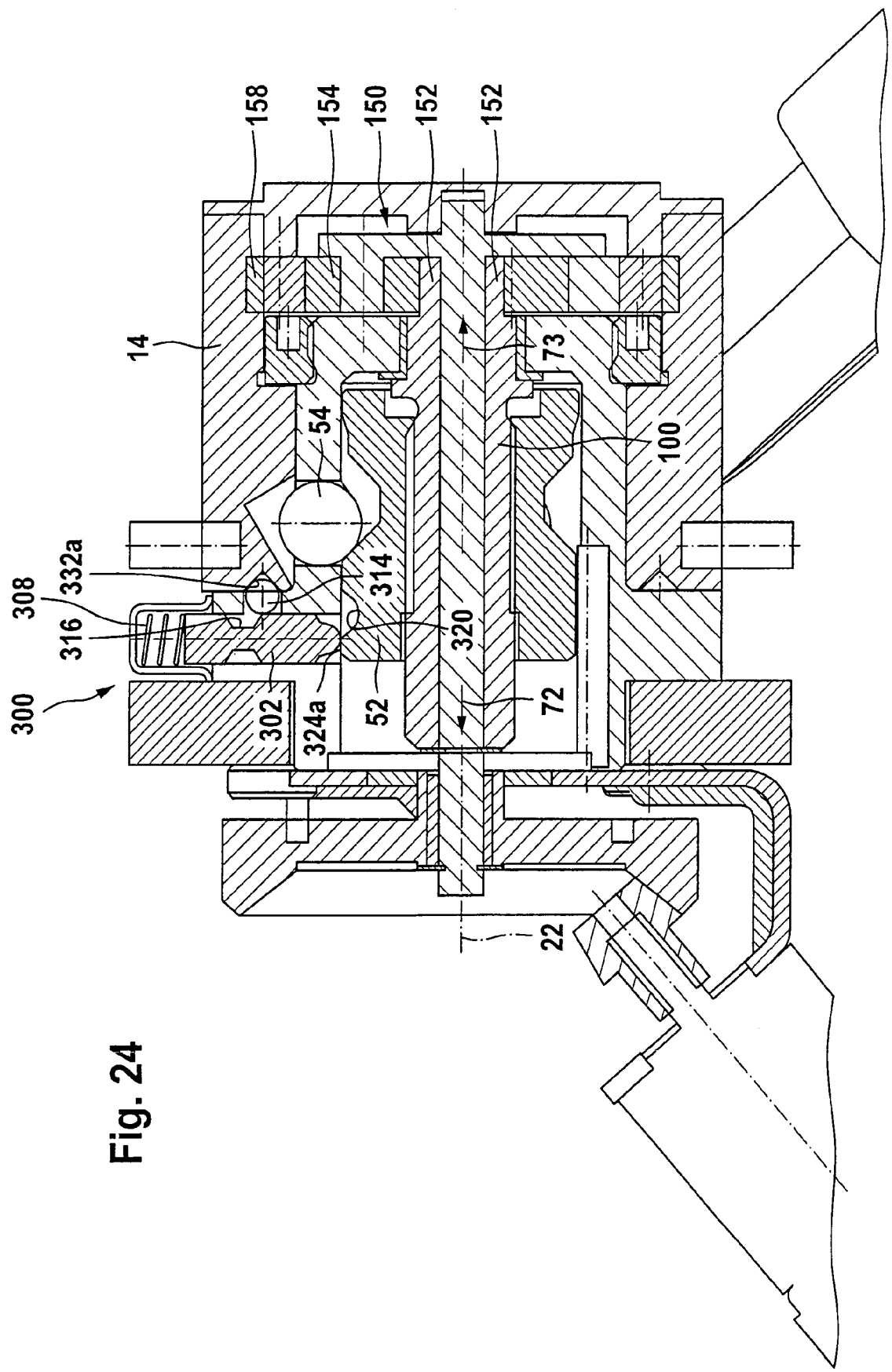
FIG. 24 shows a section, similar to FIG. 4, through the third exemplary embodiment of the trailer coupling according to the invention with the rotation-blocking body and actuating body located in a second rotation-blocking position.

This gives rise, in turn, to blocking of the rotary movement of the internal ring gear 158, and the planet gear mechanism 150 then subjects the threaded spindle 100 to such a high torque that the threaded spindle displaces the actuating body 52 further in direction 73 with such a high force that it is possible to overcome the inhibiting action of the inhibiting body 302 and of the inhibiting spring 308 and the inhibiting body slides over the inhibiting surface 322a and is displaced radially outward, so that the actuating body 52 can move further in direction 73 and, finally, the inhibiting body 302, as is illustrated in FIG. 24, is seated on the outer sliding surface 324a of the actuating body 52.

It is thus the case that the actuating body 52, overcoming the inhibiting action of the inhibiting body 302 and of the inhibiting spring 308, leaves the freewheeling position and passes into the rotation-blocking position which is associated with the rest position, and in which the rotation-blocking bodies 54, in turn, block the rotary movement of the pivot-bearing body 14.

Moreover, the displacement of the inhibiting body 302 in the radially outward direction counter to the force of the inhibiting spring 308 results in the auxiliary guide means 316 displacing the auxiliary body 314 in the direction of the depression 332a and allowing the auxiliary body to penetrate into this depression, so that additional blocking of the pivot-bearing body 14 thus also takes place at the same time.

The inhibiting arrangement 300 acts in a comparable manner upon movement of the rotation-blocking body 54 in direction 72, that is to say, first of all, the rotation-blocking body 54 passes into its freewheeling position and, in this state, the inhibiting body 302 penetrates into the surface region 320, so that it is also possible for the auxiliary body 314 to leave the depression 332a again and, overall, the pivot-bearing body 14 is able to pivot about the pivot axis 22.

Upon further movement in direction 72, the inhibiting body 302, along with the inhibiting spring 308, takes effect once again to inhibit the movement of the rotation-blocking body 54 in direction 72 and thus to inhibit the rotary movement of the threaded spindle 100, as a result of which, once again, via the planet gear mechanism 150, the internal ring gear 158 is driven in rotation and thus rotary driving takes place for the pivoting movement of the pivot-bearing body 14.

Figure 20:
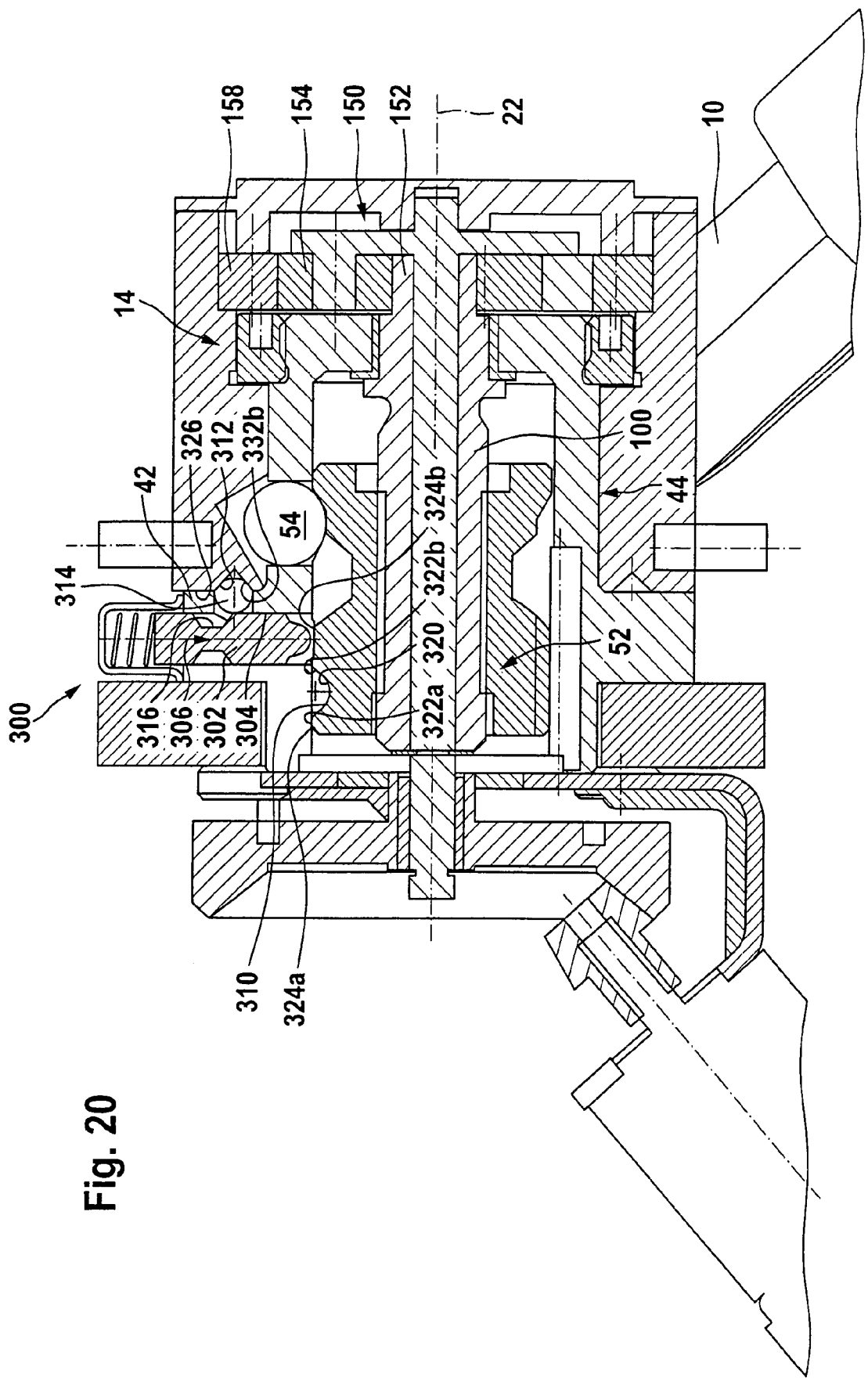
FIG. 20 shows a partial section, similar to FIG. 4, through a third exemplary embodiment of a trailer coupling according to the invention with the rotation-blocking body and actuating body located in a first rotation-blocking position, this embodiment having a single inhibiting arrangement.

Once the rest position has been left, the movement of the inhibiting body 302 in the radially outward direction is blocked once again by the auxiliary body 314 and the auxiliary guide means 316 until the operating position, illustrated in FIG. 21, has been reached and, in this position, the inhibiting body 302 moves radially outward again counter to the force of the inhibiting spring 308 since the stop (not illustrated in the drawings) provided for the pivot-bearing body 14 means that the pivot-bearing body 14 cannot pivot any further in the operating position, and thus the torque to which the threaded spindle 100 is subjected by the planet gear mechanism 150 can increase to the extent where the force in direction 72 which acts on the actuating body 52 is capable of displacing the inhibiting body 302 radially outward counter to the force of the inhibiting spring 308, so that in the operating position, finally, the inhibiting body 302 is seated on the outer sliding surface 324b again, as is illustrated in FIG. 20.

As is illustrated, moreover, in FIGS. 25 to 29, the third exemplary embodiment of the trailer coupling according to the invention also comprises a, for example additional, securing arrangement which is designated as a whole by 350 and is formed by a securing pin 352 which has a head 354 and a constriction 358 which is drawn in radially in relation to a lateral surface 356 of the securing pin 352. Furthermore, in addition to the securing pin 352, a securing body 360, which interacts with the lateral surface 356 and the constriction 358, is also provided.

Figure 25:
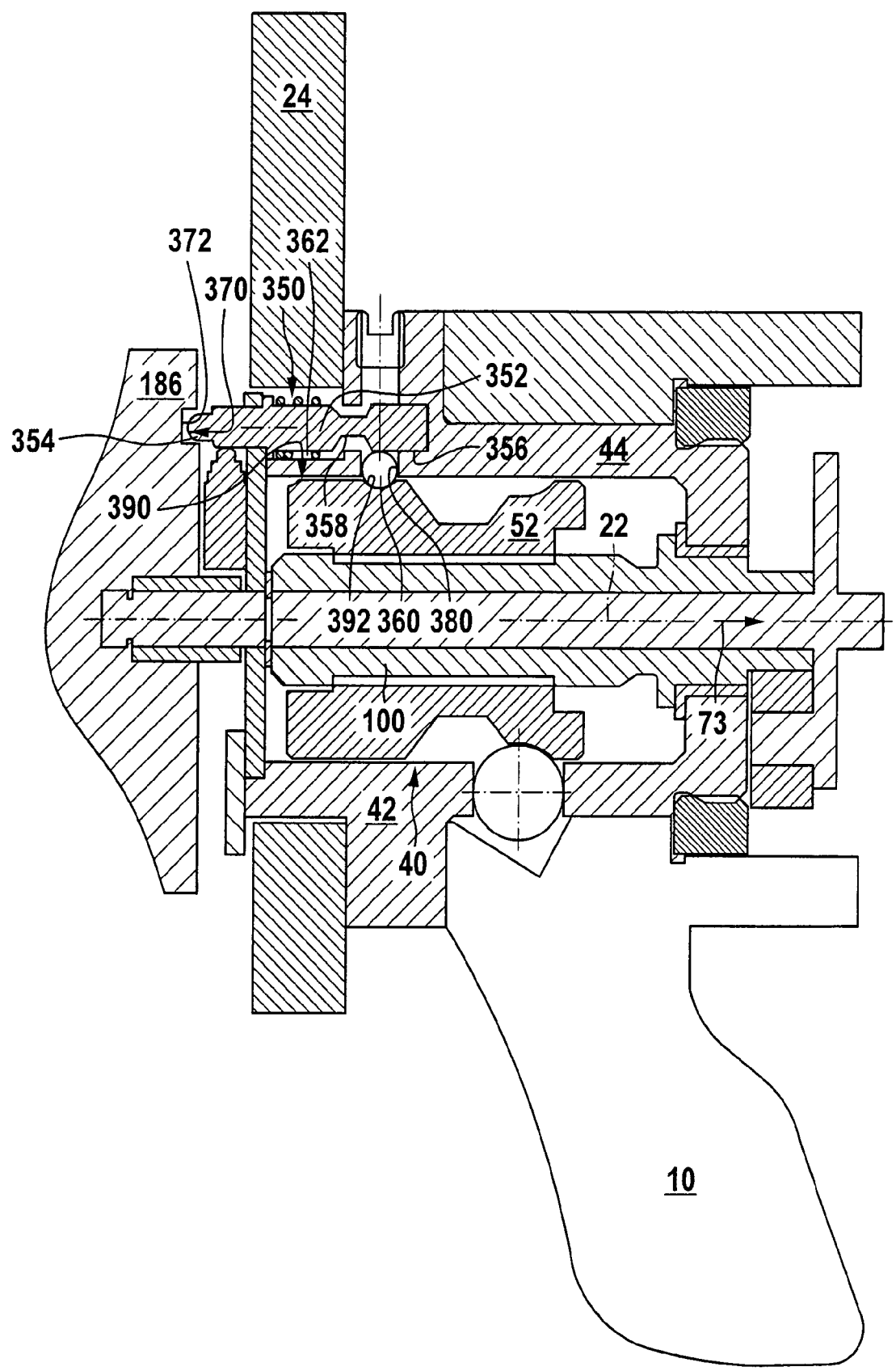
FIG. 25 shows a section, similar to FIG. 20, through the third exemplary embodiment of the trailer coupling according to the invention in the region of a securing arrangement.
Figure 26:
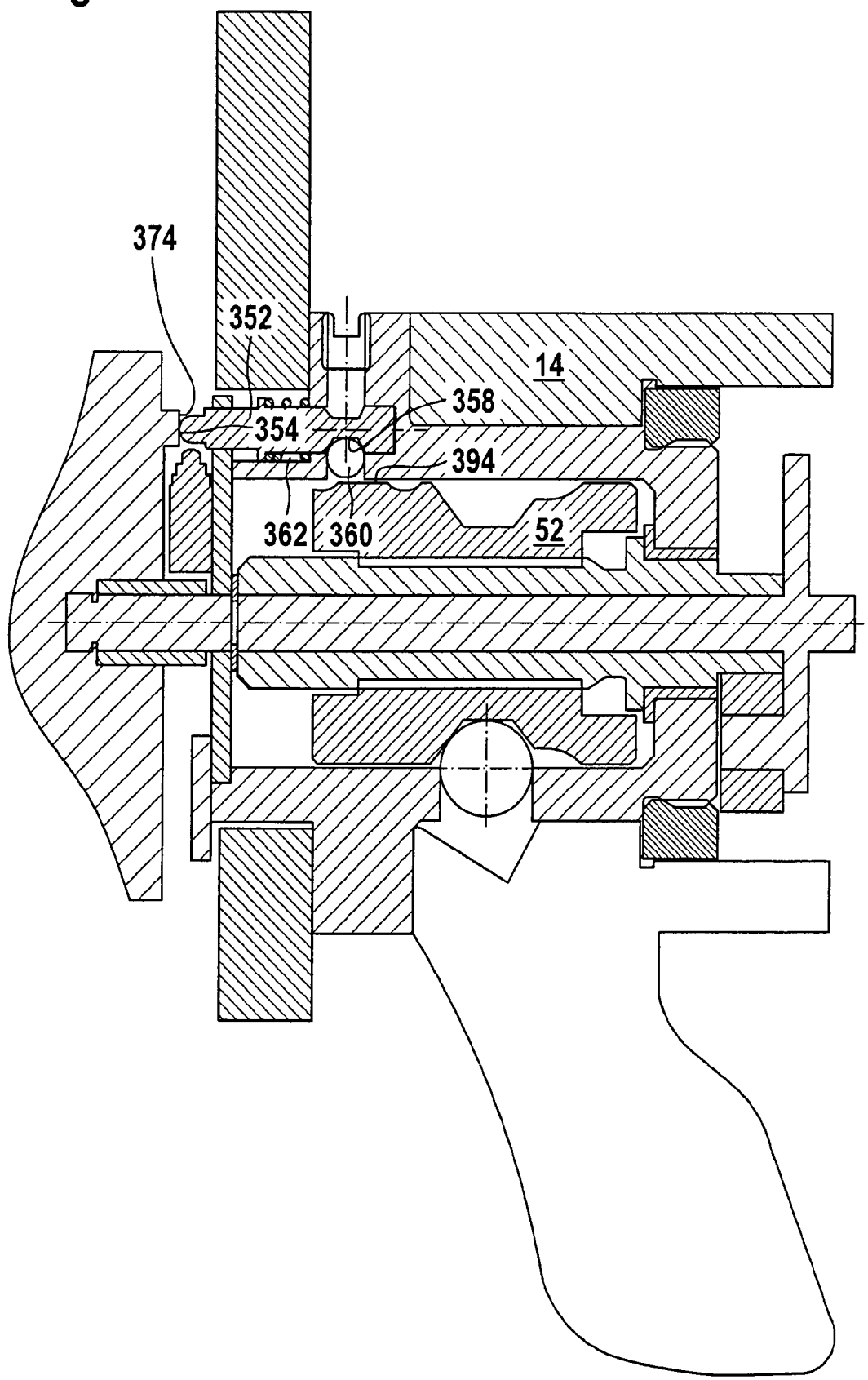
FIG. 26 shows a section through the third exemplary embodiment in the region of the securing arrangement according to FIG. 21.

The securing pin 352, for its part, is guided in a bore 362 in the guide body 40, this bore running parallel to the pivot axis 22, and, by way of its head 354, projects beyond the guide body 40 on a side which is directed toward the drive wheel 186, so that the head 354 is able to interact with an actuating track 370 which is provided in the drive wheel 186 and, as illustrated in FIG. 25, has a first depression 372 and, as is illustrated in FIG. 26, has an actuating region 374 which acts on the head 354 and pushes the securing pin 352 into the bore 362 to the extent where the securing body 360 is able to penetrate into the constriction 358, whereas, in that position of the securing pin 352 which is illustrated in FIG. 25, and in which the head 354 of the securing pin projects into the depressions 372 in the drive wheel 386, the securing body 360 is supported on the lateral surface 356 of the securing pin 352 and thus projects beyond a guide bore 380 in the direction of the actuating body 52, and thus penetrates into a depression 392 of a securing guide means 390 of the actuating body 52, this depression being associated with the operating position, and secures the actuating body 52 in the position which corresponds to the operating position A.

If the drive wheel 386, as is illustrated in FIG. 25, is then driven in order to generate movement of the actuating body 52 in direction 73, an oblique surface, which cannot be seen in the drawings, causes the head 354 to be moved out of the first depression 372 and displaced in the direction of the guide body 40, so that the entire securing pin 352 is pushed into the bore 362, to be precise into a position in which the head 354 is supported on the actuating region 374, and the securing body 360 is thus able to penetrate into the constriction 358 in the radial direction in relation to the securing pin 352.

It is then possible for the securing body 360 to move out of the depression 392 of the securing guide means 390, so that the actuating body 352 can be displaced in the direction 73.

The actuating track 370 here is formed such that, even after a small angle of rotation of the drive wheel 386 in order to generate the movement of the actuating body 52 in direction 73, the securing pin 352 is supported on the actuating region 374, so that, even after this small amount of rotation of the drive wheel 186 and corresponding rotation of the threaded spindle 100, the latter rotating to an even lesser extent on account of the reduction ratio, the actuating body 52 is able to move in the direction 73, namely in that the securing body 360 can be moved out of the depression 392 of the securing guide means 390 by the securing body 360 penetrating into the constriction 358 of the securing pin 352, so that the actuating body 52 can move in the direction 73, the securing body 360 sliding along the release portion 394 of the securing guide means 390. In the simplest case, the release portion 394 corresponds to a lateral surface of the actuating body 52.

As long as the securing body 360 slides along the release portion 394, it is also the case that the securing pin 352 is not able to penetrate into a depression provided in the drive wheel 186; rather, it is secured in its position in which it is pushed into the bore 362.

Figure 27:
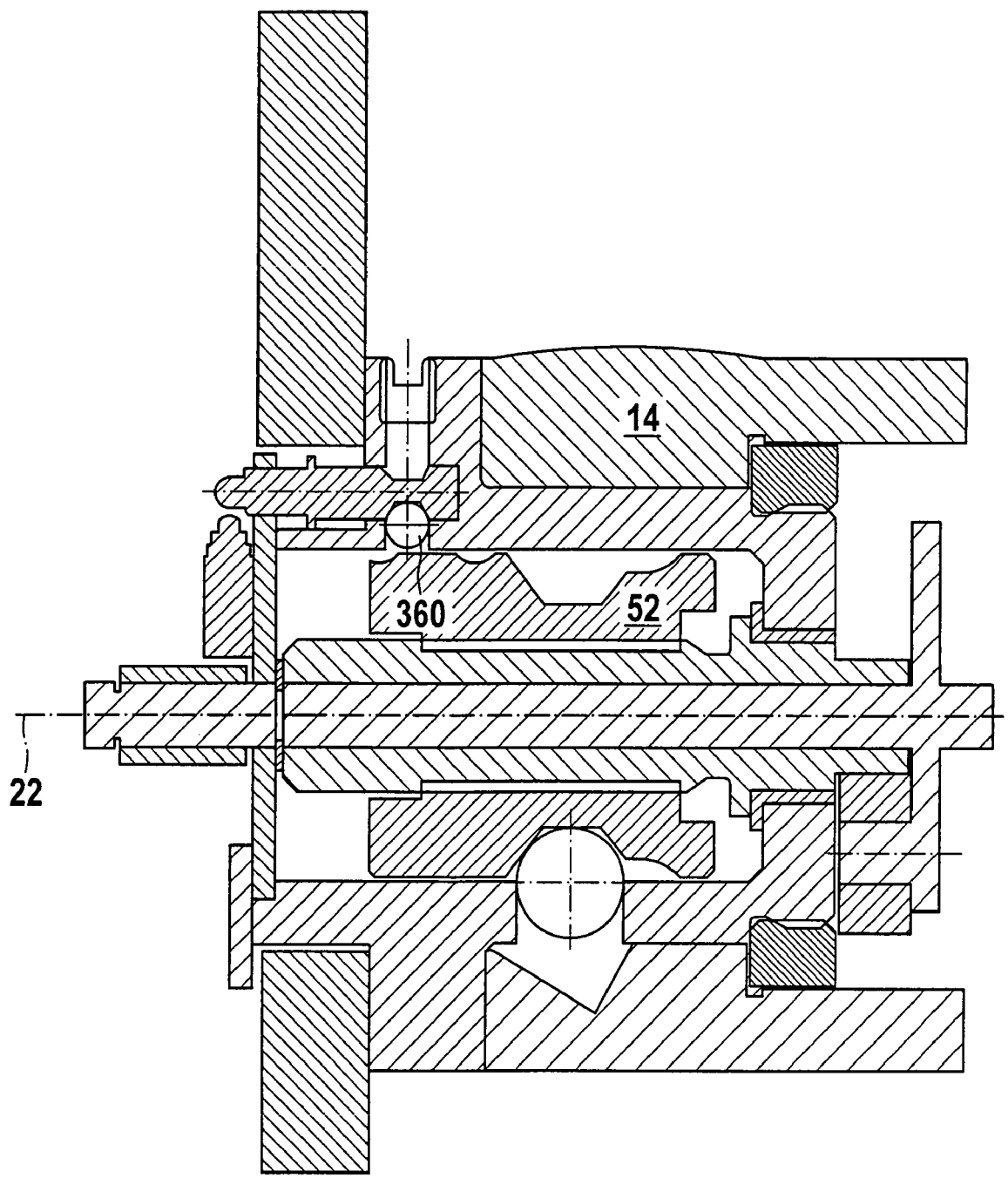
FIG. 27 shows a section through the third exemplary embodiment in the region of the securing arrangement according to FIG. 22.
Figure 28:
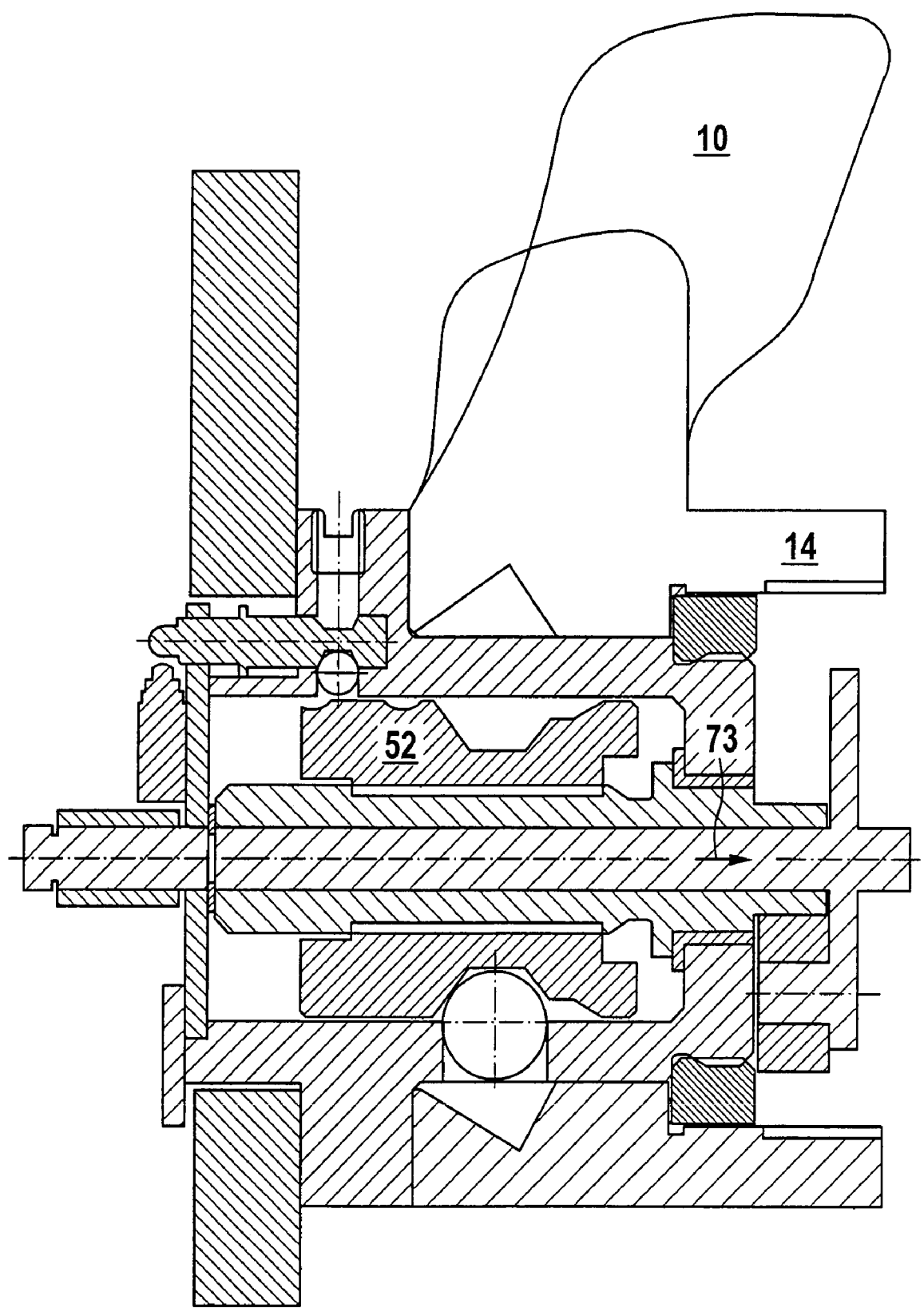
FIG. 28 shows a section through the third exemplary embodiment in the region of the securing arrangement according to FIG. 23.
Figure 29:
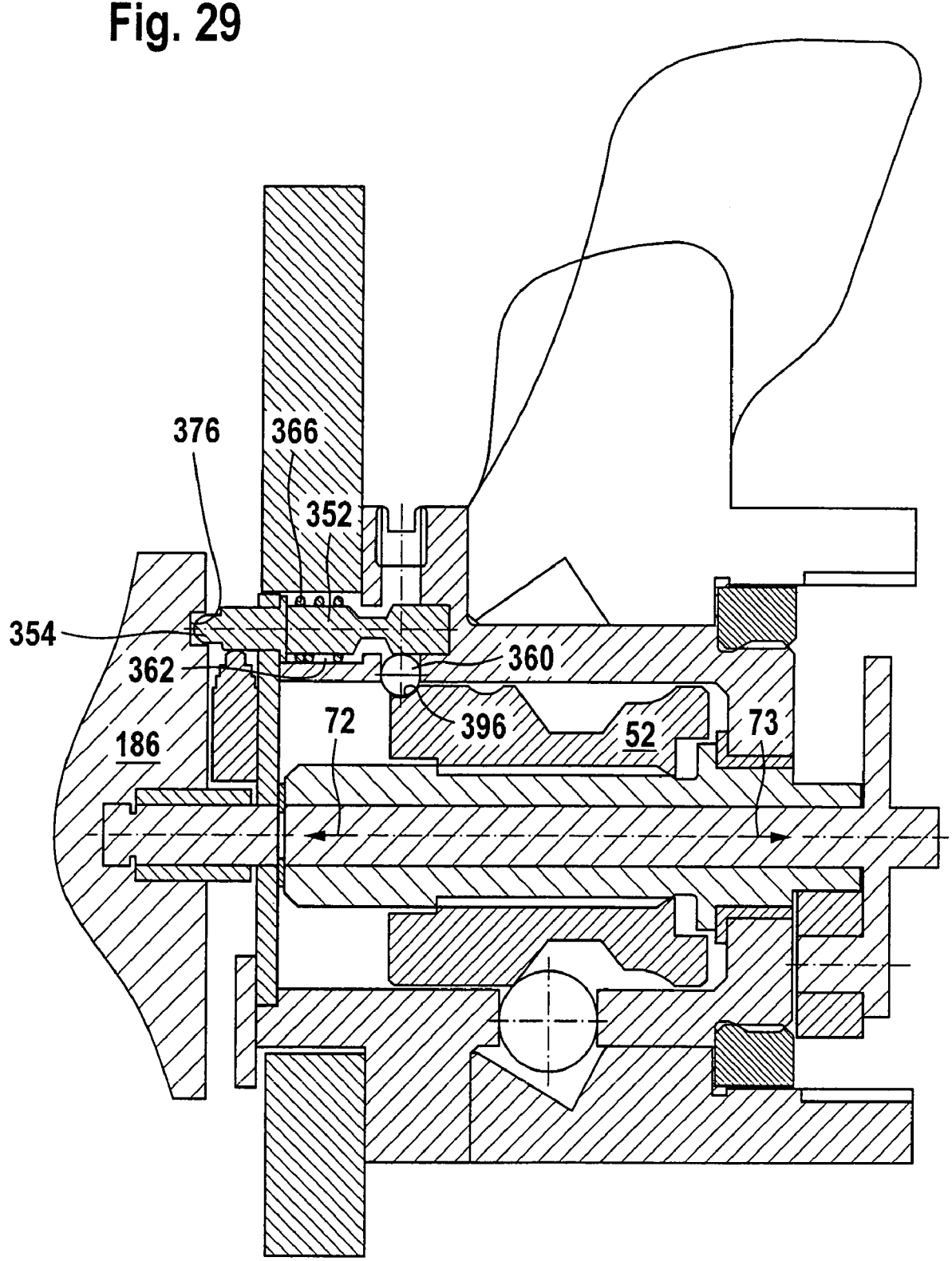
FIG. 29 shows a section through the third exemplary embodiment in the region of the securing arrangement according to FIG. 24.

This applies, in particular, to the freewheeling positions of the actuating body 52 which are illustrated in FIGS. 26 to 28, in which case the freewheeling position in FIG. 26 corresponds to the pivot-bearing body 14 being located in the operating position A, pivoting of the pivot-bearing body 14 about the pivot axis 22 takes place in FIG. 27, and in FIG. 28 the pivot-bearing body, with the ball neck 10, has reached the rest position R, in which, with the actuating body 52 moving further in the direction 73, this actuating body then passes into its rotation-blocking position associated with the rest position, the securing body 360 then being able to penetrate into the depression 396 of the securing guide means 390 and thus making it possible for the securing pin 352 to move out of the bore 362 and to penetrate, by way of the head 354, into a second depression 376 in the drive wheel 186, this second depression being associated with the rest position R, so that the securing body 360 is blocked in a positive manner in its position in which it engages in the depression 396, and thus blocks the rotation-blocking body 54 in a positive manner in the rest position R.

In the same way as the first depression 372, the second depression 376 is formed such that, following a small amount of rotary movement of the drive wheel 186 in order to generate movement of the rotation-blocking body 54 in direction 72, the head 354, in turn, is moved out of this depression and the securing pin 352 is forced into the bore 362, so that, once the drive wheel 186 starts to rotate, the blocking of the actuating body 52 by the securing body 360 is eliminated once again, in order then to allow the actuating body 52 to move in the direction 72 again.

In order to ensure that the securing pin 352 always tends to penetrate, by way of the head 354, into a depression provided in the drive wheel 186, the securing pin 352 is also forced in this direction by a compression spring 366, by means of which the positive fixing of the securing body 360 in the position in which it engages in the first depression 372 or the second depression 376 is then maintained until, as a result of rotation of the drive wheel 186, the head 354 of the securing pin 352 is moved out of one of the depressions 372 or 376 again and the securing pin 352 is thus forced into the bore 362.

In the case of a fourth exemplary embodiment, illustrated in FIG. 30, those parts which are identical to those of the previous exemplary embodiments are provided with the same designations, so that, in respect of the description thereof, reference can be made in full to what has been said in relation to the previous exemplary embodiments.

In contrast to the previous exemplary embodiments, in the case of the fourth exemplary embodiment, illustrated in FIG. 30, a threaded sleeve 400 has been arranged directly on the threaded spindle 100 as a spindle nut and, as a spindle nut, can be displaced on the threaded spindle in the directions 72 and 73.

On its side which is directed away from the threaded spindle 100, this threaded sleeve 400 guides the actuating body 52, although the latter can be displaced to a limited extent in relation to the threaded sleeve 400 between stop elements 402 and 404.

Furthermore, resiliently elastic elements, for example a group of cup springs 410, are provided between the stop element 402, in the form of a flange, and a facing flange surface 406 of the actuating body 52, these resiliently elastic elements always acting on the actuating body 52 such that the latter butts against the stop element 404.

If, however, the actuating body 52 is moved, via the threaded spindle 100 and the threaded sleeve 400, in direction 72 to the extent where the rotation-blocking bodies 54 are located in their rotation-blocking position and have been forcibly pressed into the holders 58 provided for fixing the pivot-bearing body 14 in the operating position A, then it is possible, through continued driving of the threaded spindle 100, to subject the group of cup springs 410 to compressive stressing and to switch off the drive of the threaded spindle 100 only when the group of cup springs 410 has been stressed to a sufficient extent.

For this purpose, the actuating body 52 then has to be moved in the direction of the flange 402, in which case it is lifted off from the stop element 404 in the process.

It is thus possible, in the operating position, to achieve self-adjusting activation of the rotation-blocking bodies 54 in the rotation-blocking position, since even a small amount of wear in the region of the holders 58 is possible as a result of the small amount of movement of the rotation-blocking body 54 in the direction 72 on account of the constantly prevailing force action of the stressed group of cup springs 410, without there being any need, for this purpose, for the overall drive 190 to continue moving the threaded spindle 100.

If, in contrast, the threaded spindle 100 is driven such that the threaded sleeve 400 and the rotation-blocking body 54 are moved in direction 73, then the stressing to which the group of cup springs 410 is subjected is decreased until the actuating body 52 butts, once again, against the stop element 404, and the threaded sleeve 400 and the actuating body 52 then move synchronously with one another.

Moreover, in the case of the fourth exemplary embodiment, all those parts which are identical to those of the previous exemplary embodiments are provided with the same designations, so that, in respect of the description thereof, reference can be made in full to what has been said in relation to the previous exemplary embodiments.

In the case of a fifth exemplary embodiment, illustrated in FIG. 31, the holders 58, 60 are formed such that these have wall surfaces 59 and 61 which, directly adjoining the inner surface 48 of the pivot-bearing body 14, have substantially planar abutment regions 419 and 421, against which the rotation-blocking bodies butt by way of their mutually opposite sides 89 and 88 of their lateral surface 84 in the rotation-blocking position, configuring the abutment regions 419, 421 as substantially planar regions having the advantage that the respective rotation-blocking body 54 can always come into abutment against the respective abutment region 419, 421 at the same tangent angle, irrespective of whether this abutment region widens as a result of wear, so that the respective rotation-blocking body 54 then has to penetrate into the respective holder 58, 60 over a greater distance in the guide direction 57 in order to ensure play-free fixing of the pivot-bearing body 14.

It is thus the case that, irrespective of the wear in the region of the holders 58, 60, the conditions for the abutment of the respective rotation-blocking body 54 in the holders 58, 60 do not change.

The planar abutment regions 419, 421 are preferably oriented in relation to one another such that they enclose an acute angle S with one another.

Moreover, the fifth exemplary embodiment is also formed in the same way as the previous exemplary embodiments, so that, in respect of the description thereof, reference can be made in full to what has been said in relation to the previous exemplary embodiments.

The invention claimed is:

1. Trailer coupling comprising a ball neck which can move between an operating position and a rest position and has a pivot-bearing body disposed at a first end and a coupling ball disposed at a second end, also comprising a vehicle-mounted pivot-bearing unit, in which the pivot-bearing body is accommodated such that it can pivoted between the operating position and the rest position by a pivoting movement about a pivot axis, and further comprising a rotation-blocking device which can be driven by a drive, the rotation-blocking device having at least one rotation-blocking body which can be moved in a guide direction with at least one component in the radial direction in relation to the pivot axis, the rotation-blocking body can be engaged with, and disengaged from, a receptacle by movement in the guide direction, an actuating body which has a pressure-exerting surface running transversely to the guide direction, said actuating body being moveable in an actuating direction and the movement of which in the actuating direction allows the at least one rotation-blocking body to be moved, and acted on, in the guide direction, and the drive being an actuating drive by means of which the actuating body can be moved in the actuating direction between at least one rotation-blocking position and a freewheeling position.

2. Trailer coupling according to claim 1, wherein the drive acts on the actuating body via a self-inhibiting gear mechanism.

3. Trailer coupling according to claim 2, wherein the self-inhibiting gear mechanism comprises a spindle gear mechanism with a threaded spindle.

4. Trailer coupling according to claim 3, wherein the actuating body can be moved by a spindle nut interacting with the threaded spindle.

5. Trailer coupling according to claim 4, wherein the actuating body is disposed such that it encloses the threaded spindle.

6. Trailer coupling according to claim 1, wherein the actuating body can be moved in an actuating direction substantially parallel to the pivot axis.

7. Trailer coupling according to claim 1, wherein, following one after the other in its actuating direction, the actuating body has a retraction receptacle and a pressure-exerting surface for the at least one rotation-blocking body.

8. Trailer coupling according to claim 7, wherein the pressure-exerting surface for the at least one rotation-blocking body has a wedge surface.

9. Trailer coupling according to claim 1, wherein the actuating body has two pressure-exerting surfaces for each rotation-blocking body.

10. Trailer coupling according to claim 9, wherein, as the actuating body moves in a specific direction, the pressure-exerting surfaces act differently.

11. Trailer coupling according to claim 9, wherein a first of the pressure-exerting surfaces is associated with the operating position and a second of the pressure-exerting surfaces is associated with the rest position.

12. Trailer coupling according to claim 11, wherein a retraction receptacle for the respective rotation-blocking body is disposed between the two pressure-exerting surfaces.

13. Trailer coupling according to claim 1, wherein a drive is provided for executing the pivoting movement of the pivot-bearing body.

14. Trailer coupling according to claim 1, wherein the actuating body is secured in the operating position by a securing arrangement.

15. Trailer coupling according to claim 14, wherein the securing arrangement can be actuated by a drive element.

16. Trailer coupling according to claim 15, wherein the drive element drives an actuating track of the securing arrangement.

17. Trailer coupling according to claim 14, wherein the securing arrangement has a securing body, which interacts with a securing guide means which is coupled for movement to the actuating body.

18. Trailer coupling according to claim 17, wherein at least one position of the actuating body can be secured in a positive manner by the securing body and the securing guide means.

19. Trailer coupling according to claim 18, wherein the securing guide means has at least one holder, with which the securing body can be brought into engagement.

20. Trailer coupling according to claim 1, wherein, in the rotation-blocking position corresponding to the operating position, the actuating body can be subjected to the action of an elastic energy store acting in the direction of the rotation-blocking position.

21. Trailer coupling according to claim 20, wherein the elastic energy store can be subjected to stressing by the actuating drive in order to generate an elastic force action.

22. Trailer coupling according to claim 21, wherein the elastic energy store is disposed in a drive train for the actuating body.

23. Trailer coupling according to claim 22, wherein the elastic energy store is operative between a spindle nut and the actuating body.

24. Trailer coupling according to claim 1, wherein the rotation-blocking device comprises at least two rotation-blocking bodies, and the rotation-blocking bodies can be moved in the respective guide direction by a common actuating body.

25. Trailer coupling according to claim 24, wherein the rotation-blocking device comprises at least three rotation-blocking bodies.

26. Trailer coupling according to claim 24, wherein the rotation-blocking bodies are disposed relative to the actuating body such that at least their reaction forces acting on the actuating body, and directed transversely to the pivot axis, compensate for one another at least in part.

27. Trailer coupling according to claim 24, wherein the rotation-blocking bodies are disposed relative to the actuating body such that at least their reaction forces acting on the actuating body, and directed transversely to the pivot axis, substantially cancel out one another.

28. Trailer coupling according to claim 24, wherein the rotation-blocking bodies are disposed around the actuating body.

29. Trailer coupling according to claim 24, wherein the rotation-blocking bodies are disposed substantially symmetrically in relation to a plane running perpendicularly to the pivot axis.

30. Trailer coupling according to claim 24, wherein at least two of the rotation-blocking bodies interact with their associated receptacles such that these subject the pivot-bearing body to opposing torques.

31. Trailer coupling according to claim 1, wherein the at least one rotation-blocking body is guided by a guide body which adjoins the pivot-bearing body in the radial direction.

32. Trailer coupling according to claim 31, wherein the guide body has a guide sleeve with the guide holder for the respective rotation-blocking body.

33. Trailer coupling according to claim 31, wherein the guide body is part of the vehicle-mounted pivot-bearing unit.

34. Trailer coupling according to claim 31, wherein the actuating body is enclosed by the guide body, and the pivot-bearing body engages around the guide body.

35. Trailer coupling according to claim 1, wherein the pivot-bearing body forms an outer body which encloses the pivot-bearing unit on the outside and is disposed such that it cannot be displaced in the direction of the pivot axis in relation to the pivot-bearing unit.

36. Trailer coupling according to claim 35, wherein the first end of the ball neck is fitted on the outer body.

37. Trailer coupling comprising a ball neck which can move between an operating position and a rest position and has a pivot-bearing body disposed at a first end and a coupling ball disposed at a second end, also comprising a vehicle-mounted pivot-bearing unit, in which the pivot-bearing body is accommodated such that it can pivoted between the operating position and the rest position by a pivoting movement about a pivot axis, and further comprising a rotation-blocking device which can be driven by a drive, the rotation-blocking device has at least one rotation-blocking body which can be moved in a guide direction with at least one component in the radial direction in relation to the pivot axis, in that the rotation-blocking body can be engaged with, and disengaged from, a receptacle by movement in the guide direction, an actuating body which has a pressure-exerting surface running transversely to the guide direction, said actuating body being moveable in an actuating direction and the movement of which in the actuating direction allows the at least one rotation-blocking body to be moved, and acted on, in the guide direction, said actuating body being moveable into two rotation-blocking position and a freewheeling position.

38. Trailer coupling according to claim 37, wherein the actuating body can be moved, by movement in a single movement direction, from a first rotation-blocking position into a freewheeling position and then into a second rotation-blocking position.

39. Trailer coupling comprising a ball neck which can move between an operating position and a rest position and has a pivot-bearing body disposed at a first end and a coupling ball disposed at a second end, also comprising a vehicle-mounted pivot-bearing unit, in which the pivot-bearing body is accommodated such that it can pivoted between the operating position and the rest position by a pivoting movement about a pivot axis, and further comprising a rotation-blocking device which can be driven by a drive, the drive for the rotation-blocking device and a drive for the pivoting movement of the pivot-bearing body are coupled by a planet gear mechanism.

40. Trailer coupling according to claim 39, wherein the planet gear mechanism can be driven by a single motor drive.

41. Trailer coupling according to claim 40, wherein the planet gear mechanism allows changeover between a drive of the rotation-blocking device and the pivoting movement of the pivot-bearing body.

42. Trailer coupling according to claim 39, wherein a planet-wheel carrier of the planet gear mechanism can be driven by the drive.

43. Trailer coupling according to claim 42, wherein a sun wheel of the planet gear mechanism is coupled to the drive for the rotation-blocking device.

44. Trailer coupling according to claim 42, wherein an internal ring gear of the planet gear mechanism is coupled to the drive for the pivoting movement.

45. Trailer coupling according to claim 44, wherein the internal ring gear is coupled in a rotationally fixed manner to the pivot-bearing part.

46. Trailer coupling according to claim 39, wherein driving of the pivoting movement or of the rotation-blocking device takes place depending on whether the drive of the rotation-blocking device or of the pivoting movement is inhibited.

47. Trailer coupling according to claim 46, wherein at least one inhibiting arrangement is provided in order to inhibit the drive of the rotation-blocking device.

48. Trailer coupling according to claim 47, wherein the at least one inhibiting arrangement acts on the actuating body of the rotation-blocking device.

49. Trailer coupling according to claim 48, wherein the at least one inhibiting arrangement can be controlled in dependence on a rotary position of the pivot-bearing body.

50. Trailer coupling according to claim 47, wherein two inhibiting arrangements are provided.

51. Trailer coupling according to claim 48, wherein the inhibiting arrangement has at least one inhibiting body, which is operative between the actuating body and the pivot-bearing body.

52. Trailer coupling according to claim 51, wherein the actuating body and the pivot-bearing body each have a guide track, which interacts with the inhibiting body.

53. Trailer coupling according to claim 51, wherein an inhibiting body is provided for transition from the freewheeling position into one of the rotation-blocking positions.

54. Trailer coupling according to claim 53, wherein the inhibiting body blocks, in the freewheeling position, the movement of the actuating body from the freewheeling position into the one rotation-blocking position until the pivot-bearing body is located in the operating or rest position which can be blocked by the rotation-blocking position.

55. Trailer coupling according to claim 51, wherein an inhibiting body is provided for transition from the freewheeling position into the other rotation-blocking position.

56. Trailer coupling according to claim 55, wherein the inhibiting body blocks, in the freewheeling position, the movement of the actuating body from the freewheeling position into the other rotation-blocking position until the pivot-bearing body is located in the rest or operating position which can be blocked by the other rotation-blocking position.

57. Trailer coupling according to claim 51, wherein an elastic energy store forces the inhibiting body in the direction of its position in which it exerts an inhibiting action.

58. Trailer coupling according to claim 39, wherein the planet gear mechanism is disposed on a side of the actuating body which is opposite to a carrying element of the pivot-bearing unit.

59. Trailer coupling comprising:
a ball neck which can moved between an operating position and rest position and having a pivot-bearing body disposed at a first end and a coupling ball disposed at a second end,
a vehicle-mounted pivot-bearing unit, in which the pivot-bearing body is accommodated such that it can be pivoted between the operating position and the rest position by a pivoting movement about a pivot axis,
a rotation-blocking device which can be driven by a drive, wherein the rotation-blocking device has at least one rotation-blocking body which can be moved in a guide direction with at least one component in the radial direction in relation to the pivot axis, the rotation-blocking body being engagable with and disengagble from a receptacle by movement in the guide direction,
an actuating body which has a pressure-exerting surface running transversely to the guide direction, can be moved in an actuating direction and the movement of which in the actuating direction allows the at least one rotation-blocking body to be moved and acted on in the guide direction,
the actuating body being moveable in the actuating direction between at least one rotation-blocking position and a freewheeling position,
the receptacles for the at least one rotation-blocking body having essentially planar abutment regions, against which it is possible to apply the rotation-blocking bodies in the rotation-blocking position.

60. Trailer coupling according to claim 59, wherein the abutment regions extend, in the guide direction, over an adjusting region of the rotation-blocking bodies.

61. Trailer coupling according to claim 59, wherein the abutment regions, which are located on opposite sides of the rotation-blocking bodies, enclose an acute angle with one another.

* * * * *